United States Patent
Zhang et al.

(10) Patent No.: US 12,052,668 B2
(45) Date of Patent: Jul. 30, 2024

(54) TECHNIQUES FOR UPLINK POWER CONTROL

(71) Applicant: QUALCOMM Incorporated, San Diego, CA (US)

(72) Inventors: Qian Zhang, Basking Ridge, NJ (US); Junyi Li, Fairless Hills, PA (US); Yan Zhou, San Diego, CA (US); Jung Ho Ryu, Fort Lee, NJ (US); Tianyang Bai, Somerville, NJ (US); Navid Abedini, Basking Ridge, NJ (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/480,020

(22) Filed: Sep. 20, 2021

(65) Prior Publication Data
US 2023/0086946 A1 Mar. 23, 2023

(51) Int. Cl.
*H04W 52/14* (2009.01)
*H04W 72/04* (2023.01)
*H04W 72/0446* (2023.01)

(52) U.S. Cl.
CPC ..... *H04W 52/146* (2013.01); *H04W 72/0446* (2013.01)

(58) Field of Classification Search
CPC ... H04W 52/04; H04W 52/14; H04W 52/146; H04W 52/22; H04W 52/221;
(Continued)

(56) References Cited

U.S. PATENT DOCUMENTS

| 10,412,684 B2 * | 9/2019 | Dinan | H04W 52/34 |
| 10,555,248 B2 * | 2/2020 | Fodor | H04W 24/08 |

(Continued)

FOREIGN PATENT DOCUMENTS

| EP | 3322118 A1 | 5/2018 | |
| WO | WO-2012173570 A1 | 12/2012 | |
| WO | WO-2016163805 A1 * | 10/2016 | H04L 1/18 |

OTHER PUBLICATIONS

International Search Report and Written Opinion—PCT/US2022/039523—ISA/EPO—Nov. 18, 2022.

*Primary Examiner* — Quochien B Vuong
(74) *Attorney, Agent, or Firm* — Kevin M. Donnelly; Holland & Hart LLP

(57) ABSTRACT

Methods, systems, and devices for wireless communications are described. A base station may indicate to a UE a first set of uplink power control parameters associated with half-duplex communications and a second set of uplink power control parameters associated with full-duplex communications. Alternatively, the base station may indicate the first set of uplink power control parameters and a set of power offsets associated with full-duplex communications. The base station may indicate a first set of resources associated with the first set of uplink power control parameters and a second set of resources associated with the second set of uplink power control parameters or the set of power offsets. In response, the UE may transmit one or more uplink messages over one or more resources of the second set of resources in accordance with the second set of uplink power control parameters or the set of power offsets.

30 Claims, 20 Drawing Sheets

(58) Field of Classification Search
CPC . H04W 52/223; H04W 52/24; H04W 52/241;
H04W 52/243; H04W 52/245; H04W
52/38; H04W 72/0446; H04W 72/0473;
H04L 5/00; H04L 5/14
See application file for complete search history.

(56) References Cited

U.S. PATENT DOCUMENTS 10,708,914 B2 * 7/2020 Lee .................. H04W 72/0453
10,779,241 B2 * 9/2020 Zhang ................ H04W 52/04

* cited by examiner

TECHNIQUES FOR UPLINK POWER CONTROL

TECHNICAL FIELD

The following relates to wireless communications, including techniques for uplink power control.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support half-duplex communications and full-duplex communications between communication devices (for example, between a UE and a base station). Additionally, in some cases, a base station will configure a UE with a set of uplink power control parameters, and the UE will transmit uplink messages in accordance with the configured set of uplink power control parameters. In some cases, however, the configured set of uplink power control parameters will be insufficient to support reliable full-duplex communications and may lead to inaccurate or inefficient full-duplex communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method includes receiving, from a base station, a first indication of a first set of uplink power control parameters associated with half-duplex communications at the base station and a second indication of a second set of uplink power control parameters associated with full-duplex communications at the base station, receiving, from the base station, information indicative of a first set of resources associated with the first set of uplink power control parameters and a second set of resources associated with the second set of uplink power control parameters, and transmitting, to the base station and based on the information, one or more uplink messages over one or more resources of the second set of resources in accordance with the second set of uplink power control parameters.

One innovative aspect of the subject matter described in this disclosure can be implemented in an apparatus for wireless communication at a UE. The apparatus includes a processor, memory coupled with the processor, and instructions stored in the memory. The instructions may be executable by the processor to cause the apparatus to receive, from a base station, a first indication of a first set of uplink power control parameters associated with half-duplex communications at the base station and a second indication of a second set of uplink power control parameters associated with full-duplex communications at the base station, receive, from the base station, information indicative of a first set of resources associated with the first set of uplink power control parameters and a second set of resources associated with the second set of uplink power control parameters, and transmit, to the base station and based on the information, one or more uplink messages over one or more resources of the second set of resources in accordance with the second set of uplink power control parameters.

One innovative aspect of the subject matter described in this disclosure can be implemented in another apparatus for wireless communication at a UE. The apparatus includes means for receiving, from a base station, a first indication of a first set of uplink power control parameters associated with half-duplex communications at the base station and a second indication of a second set of uplink power control parameters associated with full-duplex communications at the base station, means for receiving, from the base station, information indicative of a first set of resources associated with the first set of uplink power control parameters and a second set of resources associated with the second set of uplink power control parameters, and means for transmitting, to the base station and based on the information, one or more uplink messages over one or more resources of the second set of resources in accordance with the second set of uplink power control parameters.

One innovative aspect of the subject matter described in this disclosure can be implemented in a non-transitory computer-readable medium storing code for wireless communication at a UE. The code includes instructions executable by a processor to receive, from a base station, a first indication of a first set of uplink power control parameters associated with half-duplex communications at the base station and a second indication of a second set of uplink power control parameters associated with full-duplex communications at the base station, receive, from the base station, information indicative of a first set of resources associated with the first set of uplink power control parameters and a second set of resources associated with the second set of uplink power control parameters, and transmit, to the base station and based on the information, one or more uplink messages over one or more resources of the second set of resources in accordance with the second set of uplink power control parameters.

Another innovative aspect of the subject matter described in this disclosure can be implemented in a method for wireless communication at a UE. The method includes receiving, from a base station, a first indication of a set of uplink power control parameters associated with half-duplex communications at the base station and a second indication of a set of power offsets associated with full-duplex communications at the base station, receiving, from the base station, information indicative of a first set of resources associated with the set of uplink power control parameters and a second set of resources over which to apply the set of power offsets to the set of uplink power control parameters, and transmitting, to the base station and based on the information, one or more uplink messages over one or more resources of the second set of resources in accordance with the set of uplink power control parameters and the applied set of power offsets.

Another innovative aspect of the subject matter described in this disclosure can be implemented in an apparatus for wireless communication at a UE. The apparatus includes a processor, memory coupled with the processor, and instructions stored in the memory. The instructions may be executable by the processor to cause the apparatus to receive, from a base station, a first indication of a set of uplink power control parameters associated with half-duplex communications at the base station and a second indication of a set of power offsets associated with full-duplex communications at the base station, receive, from the base station, information indicative of a first set of resources associated with the set of uplink power control parameters and a second set of resources over which to apply the set of power offsets to the set of uplink power control parameters, and transmit, to the base station and based on the information, one or more uplink messages over one or more resources of the second set of resources in accordance with the set of uplink power control parameters and the applied set of power offsets.

Another innovative aspect of the subject matter described in this disclosure can be implemented in another apparatus for wireless communication at a UE. The apparatus includes means for receiving, from a base station, a first indication of a set of uplink power control parameters associated with half-duplex communications at the base station and a second indication of a set of power offsets associated with full-duplex communications at the base station, means for receiving, from the base station, information indicative of a first set of resources associated with the set of uplink power control parameters and a second set of resources over which to apply the set of power offsets to the set of uplink power control parameters, and means for transmitting, to the base station and based on the information, one or more uplink messages over one or more resources of the second set of resources in accordance with the set of uplink power control parameters and the applied set of power offsets.

Another innovative aspect of the subject matter described in this disclosure can be implemented in a non-transitory computer-readable medium storing code for wireless communication at a UE. The code includes instructions executable by a processor to receive, from a base station, a first indication of a set of uplink power control parameters associated with half-duplex communications at the base station and a second indication of a set of power offsets associated with full-duplex communications at the base station, receive, from the base station, information indicative of a first set of resources associated with the set of uplink power control parameters and a second set of resources over which to apply the set of power offsets to the set of uplink power control parameters, and transmit, to the base station and based on the information, one or more uplink messages over one or more resources of the second set of resources in accordance with the set of uplink power control parameters and the applied set of power offsets.

Another innovative aspect of the subject matter described in this disclosure can be implemented in a method for wireless communication at a base station. The method includes transmitting, to a UE, a first indication of a first set of uplink power control parameters associated with half-duplex communications at the base station and a second indication of a second set of uplink power control parameters associated with full-duplex communications at the base station, transmitting, to the UE, information indicative of a first set of resources associated with the first set of uplink power control parameters and a second set of resources associated with the second set of uplink power control parameters, and receiving, from the UE and based on the information, one or more uplink messages over one or more resources of the second set of resources in accordance with the second set of uplink power control parameters.

Another innovative aspect of the subject matter described in this disclosure can be implemented in an apparatus for wireless communication at a base station. The apparatus includes a processor, memory coupled with the processor, and instructions stored in the memory. The instructions may be executable by the processor to cause the apparatus to transmit, to a UE, a first indication of a first set of uplink power control parameters associated with half-duplex communications at the base station and a second indication of a second set of uplink power control parameters associated with full-duplex communications at the base station, transmit, to the UE, information indicative of a first set of resources associated with the first set of uplink power control parameters and a second set of resources associated with the second set of uplink power control parameters, and receive, from the UE and based on the information, one or more uplink messages over one or more resources of the second set of resources in accordance with the second set of uplink power control parameters.

Another innovative aspect of the subject matter described in this disclosure can be implemented in another apparatus for wireless communication at a base station. The apparatus includes means for transmitting, to a UE, a first indication of a first set of uplink power control parameters associated with half-duplex communications at the base station and a second indication of a second set of uplink power control parameters associated with full-duplex communications at the base station, means for transmitting, to the UE, information indicative of a first set of resources associated with the first set of uplink power control parameters and a second set of resources associated with the second set of uplink power control parameters, and means for receiving, from the UE and based on the information, one or more uplink messages over one or more resources of the second set of resources in accordance with the second set of uplink power control parameters.

Another innovative aspect of the subject matter described in this disclosure can be implemented in a non-transitory computer-readable medium storing code for wireless communication at a base station. The code includes instructions executable by a processor to transmit, to a UE, a first indication of a first set of uplink power control parameters associated with half-duplex communications at the base station and a second indication of a second set of uplink power control parameters associated with full-duplex communications at the base station, transmit, to the UE, information indicative of a first set of resources associated with the first set of uplink power control parameters and a second set of resources associated with the second set of uplink power control parameters, and receive, from the UE and based on the information, one or more uplink messages over one or more resources of the second set of resources in accordance with the second set of uplink power control parameters.

Another innovative aspect of the subject matter described in this disclosure can be implemented in a method for wireless communication at a base station. The method includes transmitting, to a UE, a first indication of a set of uplink power control parameters associated with half-duplex communications at the base station and a second indication of a set of power offsets associated with full-duplex communications at the base station, transmitting, to the UE, information indicative of a first set of resources associated with the set of uplink power control parameters and a second set of resources over which to apply the set of power offsets to the set of uplink power control parameters, and receiving, from the UE and based on the information, one or more uplink messages over one or more resources of the second set of resources in accordance with the set of uplink power control parameters and the applied set of power offsets.

Another innovative aspect of the subject matter described in this disclosure can be implemented in an apparatus for wireless communication at a base station. The apparatus includes a processor, memory coupled with the processor, and instructions stored in the memory. The instructions may be executable by the processor to cause the apparatus to transmit, to a UE, a first indication of a set of uplink power control parameters associated with half-duplex communications at the base station and a second indication of a set of power offsets associated with full-duplex communications at the base station, transmit, to the UE, information indicative of a first set of resources associated with the set of uplink power control parameters and a second set of resources over which to apply the set of power offsets to the set of uplink power control parameters, and receive, from the UE and based on the information, one or more uplink messages over one or more resources of the second set of resources in accordance with the set of uplink power control parameters and the applied set of power offsets.

Another innovative aspect of the subject matter described in this disclosure can be implemented in another apparatus for wireless communication at a base station. The apparatus includes means for transmitting, to a UE, a first indication of a set of uplink power control parameters associated with half-duplex communications at the base station and a second indication of a set of power offsets associated with full-duplex communications at the base station, means for transmitting, to the UE, information indicative of a first set of resources associated with the set of uplink power control parameters and a second set of resources over which to apply the set of power offsets to the set of uplink power control parameters, and means for receiving, from the UE and based on the information, one or more uplink messages over one or more resources of the second set of resources in accordance with the set of uplink power control parameters and the applied set of power offsets.

Another innovative aspect of the subject matter described in this disclosure can be implemented in a non-transitory computer-readable medium storing code for wireless communication at a base station. The code includes instructions executable by a processor to transmit, to a UE, a first indication of a set of uplink power control parameters associated with half-duplex communications at the base station and a second indication of a set of power offsets associated with full-duplex communications at the base station, transmit, to the UE, information indicative of a first set of resources associated with the set of uplink power control parameters and a second set of resources over which to apply the set of power offsets to the set of uplink power control parameters, and receive, from the UE and based on the information, one or more uplink messages over one or more resources of the second set of resources in accordance with the set of uplink power control parameters and the applied set of power offsets.

DETAILED DESCRIPTION

Figure 1:
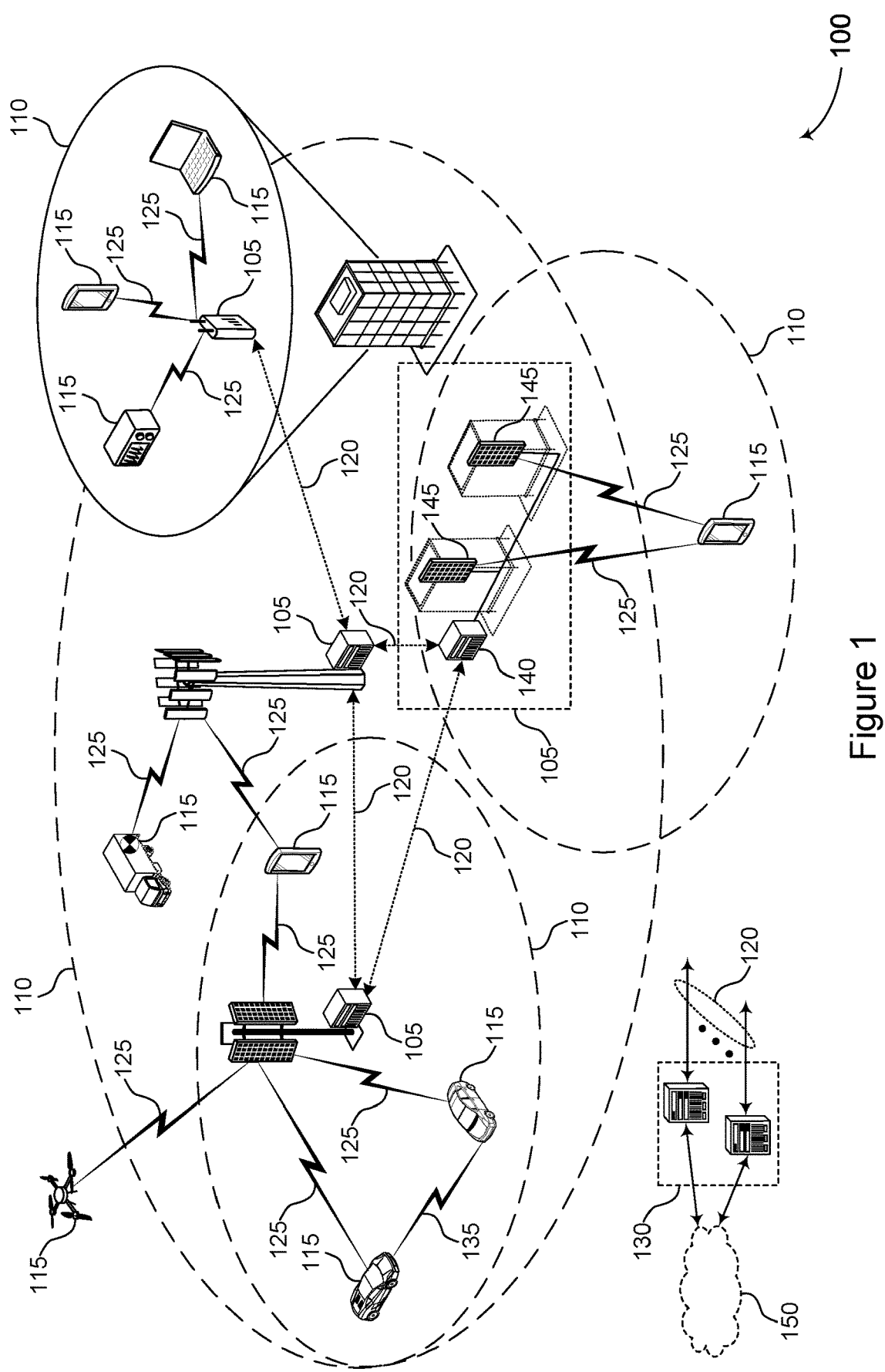
FIGS. 1 and 2 illustrate examples of wireless communications systems that supports techniques for uplink power control in accordance with aspects of the present disclosure.

Some wireless communications devices (for example, a base station, a user equipment (UE)) may support half-duplex and full-duplex wireless communications. To support half-duplex communications, a communication device may be configured to transmit or receive in one direction at a time (for example, uplink or downlink). To support full-duplex communications, the communication device may be configured to transmit and receive communications concurrently (for example, concurrently or simultaneously communicate downlink communications and uplink communications). Additionally, in some cases, a base station may configure a UE with a set of uplink power control parameters that the UE uses to determine transmit powers for uplink messages transmitted to the base station by the UE. However, in some cases, the transmit powers determined by the UE using the set of uplink power control parameters will be insufficient to support relatively reliable full-duplex communications at the base station due to, for example, self-interference at the base station (such as the interference resulting from concurrently receiving uplink messages and transmitting downlink messages) reducing a reliability of the received uplink messages.

Various aspects generally relate to supporting uplink power control for communications, including half-duplex communications and full-duplex communications, and more specifically, to configuring a UE with multiple sets of uplink power control parameters or a set of power offsets that enable half-duplex and full-duplex power control. For example, a base station may configure a UE with a first set of uplink power control parameters and a second set of uplink power control parameters. Additionally, or alternatively, the base station may configure the UE with the first set of uplink power control parameters and a set of power offsets. The first set of uplink power control parameters may be used while the base station is operating in a half-duplex mode. The second set of uplink power control parameters may be used, or the set of power offsets may be applied to the first set of uplink control parameters, while the base station is operating in a full-duplex mode (although the operating mode of the base station may be unknown to the UE). For example, the base station may indicate, to the UE, a first set of resources associated with half-duplex communications at the base station over which the UE may use the first set of uplink power control parameters. The base station may also indicate a second set of resources associated with full-duplex communications at the base station over which the UE may use the second set of uplink power control parameters or apply the set of power offsets. In response, the UE may transmit, to the base station, uplink messages over the first set of resources in accordance with the first set of uplink power control parameters and uplink messages over the second set of resources in accordance with the second set of uplink power control parameters or the applied set of power offsets.

Particular aspects of the subject matter described in this disclosure may be implemented to realize one or more of the following potential advantages. The techniques employed by the described communication devices may provide benefits and enhancements to supporting reliable full-duplex communications (for example, at a base station). For example, operations performed by the described communication devices may increase a reliability of full-duplex communications by enabling a first communication device, such as a UE, to adjust a transmission power of uplink messages transmitted to a second communication device, such as the base station, to compensate for self-interference resulting from full-duplex communications performed by the second communication device. For instance, a UE may use uplink power control parameters or power offsets to increase a transmission power of uplink messages transmitted to a base station while the base station is operating in a full-duplex mode. In some implementations, increasing the transmission power of the uplink messages may increase a reliability of the uplink messages and compensate for the self-interference at the base station. In some implementations, the operations performed by the described communication devices (for example, UEs) to adjust uplink transmission power based on a communication device operating mode, such as a base station operating mode, may reduce uplink transmission failures associated with full-duplex communications thereby improving data rates, spectral efficiency, and latency. In some other implementations, operations performed by the described communication devices may also support improvements to power consumption, coordination between devices, and resource utilization, among other benefits.

Aspects of the disclosure are initially described in the context of wireless communications systems. Aspects of the disclosure are additionally described in the context of process flows. Aspects of the disclosure are further illustrated by and described with reference to apparatus diagrams, system diagrams, and flowcharts that relate to techniques for uplink power control.

FIG. 1 illustrates an example of a wireless communications system 100 that supports techniques for uplink power control in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or fifth generation (5G) core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support half-duplex communications and full-duplex communications between various base stations 105 and UEs 115. For example, a UE 115 may support concurrently (for example, simultaneously) receiving downlink messages from a first base station 105 and transmitting uplink messages to a second base station 105. Additionally, or alternatively, a base station 105 may support concurrently receiving uplink messages from a first UE 115 and transmitting downlink messages to a second UE 115. Additionally, or alternatively, a base station 105 and a UE 115 may support concurrently communicating downlink messages and uplink messages with each other.

Full-duplex communications may increase throughput and spectral efficiency and reduce latency relative to half-duplex communications, for example, due to concurrently communicating uplink and downlink messages rather than sequentially communicating uplink and downlink messages. However, in some cases, full-duplex communications may be associated with increased levels of self-interference (for example, caused by clutter echo) at a base station 105 or a UE 115, which may reduce a reliability of the full-duplex communications. For example, self-interference may result from reflected transmitted signals interfering with received signals at the base station 105 or the UE 115. For instance, a transmitted signal may reflect off of a surrounding object and echo back to the base station 105 or the UE 115, which may interfere with another signal received by the base station 105 or the UE 115.

Various aspects of the described techniques enable uplink power control that increases a reliability associated with full-duplex communications. For example, a base station 105 may configure a UE 115 with a first set of uplink power control parameters associated with half-duplex communications at the base station 105. That is, the UE 115 may use the first set of uplink power control parameters to determine a transmission power of one or more uplink messages transmitted to the base station 105 by the UE 115 while the base station 105 operates in a half-duplex mode. However, in some cases, a transmission power determined using the first set of uplink power control parameters may be insufficient (for example, too low) to overcome (for example, compensate for) self-interference experienced at the base station 105 while the base station 105 operates in a full-duplex mode.

According to the described techniques, the base station 105 may configure the UE 115 with a second set of uplink power control parameters associated with full-duplex communications at the base station 105. That is, the UE 115 may use the second set of uplink power control parameters to determine a transmission power of one or more uplink messages while the base station 105 operates in the full-duplex mode. The second set of uplink power control parameters may be associated with uplink messages having a higher transmission power than uplink messages associated with the first set of uplink power control parameters, which may compensate for the self-interference experienced at the base station 105 while operating in the full-duplex mode.

Alternatively, the base station 105 may configure the UE 115 with a set of power offsets associated with full-duplex communications at the base station 105. Here, the UE 115 may apply the set of power offsets to the first set of uplink power control parameters (for example, to a transmission power determined using the first set of uplink power control parameters, to one or more parameters of the first set of uplink power control parameters) while the base station 105 operates in the full-duplex mode. In some examples, applying the set of power offsets may boost (for example, increase) a transmission power of a corresponding uplink message relative to determining the transmission power without applying the set of power offsets, which may compensate for the self-interference experienced at the base station 105 while operating in the full-duplex mode.

Figure 2:
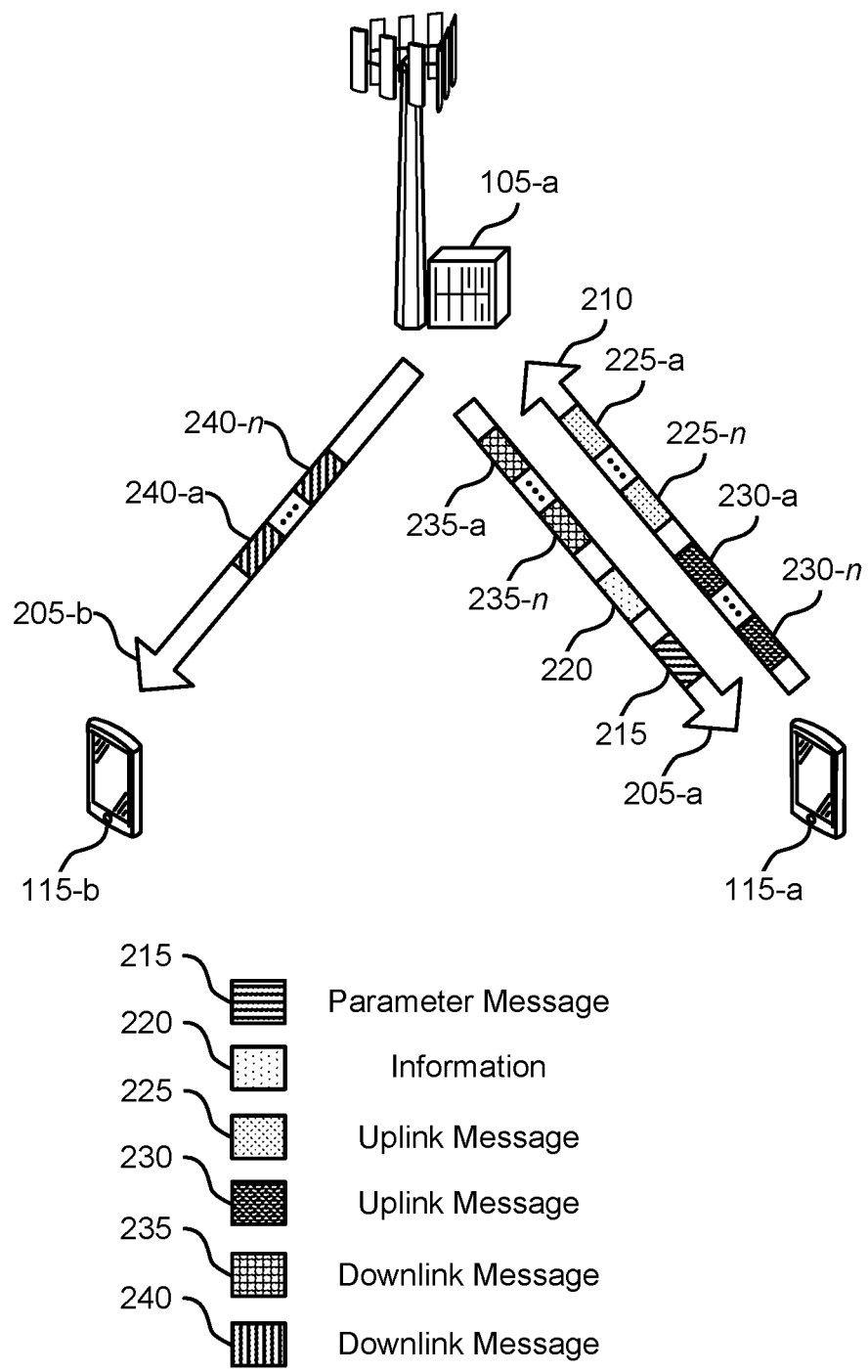

FIG. 2 illustrates an example of a wireless communications system 200 that supports techniques for uplink power control in accordance with aspects of the present disclosure. The wireless communications system 200 may implement or may be implemented by aspects of the wireless communications system 100. For example, the wireless communications system 200 may include a base station 105-a, a UE 115-a, and a UE 115-b, which may be examples of the corresponding devices described with reference to FIG. 1. In some examples, the wireless communications system 200 may support multiple radio access technologies including fourth generation (4G) systems such as LTE systems, LTE-A systems, or LTE-A Pro systems, and 5G systems which may be referred to as NR systems. The wireless communications system 200 may support uplink power control for half-duplex and full-duplex communications, which may provide improvements to reliability, data rates, spectral efficiency, latency, power consumption, coordination between devices, resource utilization, and latency, among other benefits.

The wireless communications system 200 may support communications between the base station 105-a and the UE 115-a and between the base station 105-a and the UE 115-b. For example, the base station 105-a may transmit downlink messages to the UE 115-a over a channel 205-a and to the UE 115-b over a channel 205-b, each of which may be examples of a communication link 125 described with reference to FIG. 1. In some examples, the channels 205 may examples of a physical downlink channel, such as a physical downlink control channel (PDCCH), a physical downlink shared channel (PDSCH), a physical random access channel (PRACH), a physical broadcast channel (PBCH), or some other physical downlink channel. The UE 115-a may transmit uplink messages to the base station 105-a over a channel 210, which may be an example of a communication link 125. In some examples, the channel 210 may be an example of a physical uplink channel, such as a physical uplink control channel (PUCCH), a physical uplink shared channel (PUSCH), a PRACH, or some other physical uplink channel.

The wireless communications system 200 may support half-duplex communications and full-duplex communications. For example, the base station 105-a, the UE 115-a, and the UE 115-b may operate in a half-duplex mode or a full-duplex mode. In the half-duplex mode, the base station 105-a may sequentially transmit downlink messages to the UEs 115 and receive uplink messages from the UEs 115, and the UEs 115 may sequentially transmit uplink messages to the base station 105-a and receive downlink messages from the base station 105-a. In the full-duplex mode, the base station 105-a and the UEs 115 may concurrently (for example, simultaneously) communicate uplink messages and downlink messages. In some examples, one or multiple of the base station 105-a, the UE 115-a, and the UE 115-b may operate in the full-duplex mode at a same time. For example, the base station 105-a may operate in the full-duplex mode while the UE 115-a and the UE 115-b operate in the half-duplex mode. Alternatively, the base station 105-a may operate in the half-duplex mode, and one or both of the UE 115-a and the UE 115-b may operate in the full-duplex mode (for example, by concurrently communicating with another base station 105 (not shown)). Alternatively, both the base station 105-a and one or more of the UE 115-a and the UE 115-b may operate in the full-duplex mode.

The wireless communications system 200 may support uplink power control to support both half-duplex communications and full-duplex communications. For example, the base station 105-a may configure the UE 115-a with uplink power control parameters, which the UE 115-a may use to determine a transmission power of various types of uplink messages. In some instances, the UE 115-a may use the uplink power control parameters to determine a transmission power for PUSCH transmissions, PUCCH transmissions, sounding reference signal (SRS) transmissions, and PRACH transmissions, among other types of uplink transmissions. For example, the UE 115-a may determine the transmission power for PUSCH transmissions according to Equation (1) below:

$$P_{PUSCH,b,f,c}(i,j,q_d,l) = \min\{P_{CMAX,f,c}(i), P_{OPUSCH,b,f,c}(j) + 10\log_{10}(2^{\mu} \cdot M^{PUSCH}_{RB,b,f,c}(i)) + \alpha_{b,f,c}(j) \cdot PL_{b,f,c}(q_d) + \Delta_{TF,b,f,c}(i) + f_{b,f,c}(i,l)\}[\text{dBm}] \quad (1)$$

where $P_{PUSCH,b,f,c}(i, j, q_d, l)$ is the determined transmission power for the PUSCH transmission in decibel (dB) milliwatts (dBm), b is an active BWP associated with the PUSCH transmission, f is a carrier associated with the PUSCH transmission, c is a serving cell associated with the PUSCH transmission, i is an occasion index of PUSCH transmission, j is a parameter set configuration index, $q_d$ is a reference signal index used to determine (for example, calculate) a pathloss estimate, l is an index of a PUSCH power control adjustment state, $P_{CMAX,f,c}$ is a maximum transmit power at the UE 115-a, $P_{OPUSCH,b,f,c}(j)$ is a target base station receive power, $M^{PUSCH}_{RB,b,f,c}$ is a bandwidth of a PUSCH resource assignment for the PUSCH transmission expressed in a number of RBs, $\alpha_{b,f,c}(j)$ is an optimization parameter between 0 and 1 (for example, set relatively low while an interference level is high, set relatively high to compensate for path loss), $PL_{b,f,c}(q_d)$ is a downlink path loss estimate determined (for example, calculated) using a reference signal with index $q_d$, $\Delta_{TF,b,f,c}(i)$ is a power offset for a transmission format (for example, a modulation and coding scheme (MCS)), and $f_{b,f,c}(i, l)$ is a closed loop power control function. In some examples, one or more of the variables of a power control equation (for example, in Equation (1)) may be considered uplink power control parameters configured by the base station 105-a, among other examples.

To support uplink power control for half-duplex communications and full-duplex communications, the base station 105-a may transmit a parameter message 215 to the UE 115-a. The parameter message 215 may include information that enables the UE 115-a to adjust a transmission power of one or more uplink messages based on an operating mode of the base station 105-a (for example, whether the base station 105-a operates in the half-duplex mode or the full duplex mode). For example, the parameters message 215 may include a first indication of a first set of uplink power control parameters that are associated with half-duplex communications at the base station 105-*a*. For instance, while the base station 105-*a* is operating in the half-duplex mode, the UE 115-*a* may use the first set of uplink power control parameters to determine a transmission power for one or more uplink messages 230 (for example, in accordance with a power control equation such as Equation (1)).

In some examples, the parameter message 215 may include a second indication of a second set of uplink power control parameters associated with full-duplex communications at the base station 105-*a*. For example, while the base station 105-*a* is operating in the full-duplex mode, the UE 115-*a* may use the second set of uplink power control parameters to determine a transmission power for one or more uplink messages 225 (for example, in accordance with a power control equation). In some implementations, the second set of uplink power control parameters may be associated with a higher transmission power than the first set of uplink power control parameters. For example, the transmission power for the uplink messages 225 determined using the second set of uplink power control parameters may be greater than the transmission power for the uplink messages 230 determined using the first set of uplink power control parameters (for example, to compensate for self-interference associated with full-duplex communications at the base station 105-*a*).

In some examples, the parameter message 215 may include a second indication of a set of power offsets associated with full-duplex communications at the base station 105-*a*. For example, while the base station 105-*a* is operating in the full-duplex mode, the UE 115-*a* may apply the set of power offsets to the first set of uplink power control parameters to determine the transmission power for the one or more uplink messages 225. In some implementations, the UE 115-*a* may determine a transmission power for the uplink messages 225 using the first set of uplink power control parameters and may apply the set of power offsets to the determined transmission power to determine a final transmission power of the uplink messages 225. In some other implementations, the UE 115-*a* may apply the set of power offsets to one or more uplink power control parameters of the first set of uplink power control parameters and determine the transmission power for the uplink messages 225 using the first set of uplink power control parameters with the set of power offsets applied. For example, the set of power offsets may include one or more delta offset values that may be individually applied to corresponding uplink power control parameters of a power control equation. For instance, delta offset values may be applied (for example, added) to one or more of the uplink power control parameters $P_{OPUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$, and $f_{b,f,c}(i, l)$, among other uplink power control parameters included in power control equations. In some examples, applying the set of power offsets may increase a transmission power of the uplink messages 225 relative to the transmission power of the uplink messages 230.

In some examples, the base station 105-*a* may transmit the parameter message 215 via RRC signaling. In some implementations the base station 105-*a* may transmit multiple parameter messages 215 to communicate the first indication and the second indication. In some implementations, the parameter message 215 may indicate both of the second set of uplink power control parameters and the set of power offsets. In this example, the base station 105-*a* may indicate whether to use the second set of uplink power control parameters or the set of power offsets (or some combination) to determine the transmission power for the uplink messages 225.

The base station 105-*a* may indicate to the UE 115-*a* a duration in which to use the first set of uplink power control parameters and a duration in which to use the second set of uplink power control parameters or apply the set of power offsets. For example, the base station 105-*a* may transmit information 220 to the UE 115-*a* that is indicative of a first set of resources associated with the first set of uplink power control parameters and a second set of resources associated with the second set of uplink power control parameters or over which to apply the set of power offsets. For instance, the UE 115-*a* may use the first set of uplink power control parameters to determine transmission powers of uplink messages transmitted over resources of the first set of resources (for example, uplink messages 230). The UE 115-*a* may use the second set of uplink power control parameters or apply the set of power offsets to the first set of uplink power control parameters to determine transmission powers of uplink messages transmitted over resources of the second set of resources (for example, uplink messages 225). In some examples, the base station 105-*a* may transmit the information 220 to the UE 115-*a* in downlink control information (DCI), a MAC-control element (MAC-CE), or RRC signaling. In some implementations, the base station 105-*a* may transmit the information 220 over one or more multiple messages. In some examples, the first set of resources and the second set of resources may each correspond to a respective quantity of slots or symbols in a time domain.

The information 220 may indicate the first set of resources and the second set of resources to the UE 115-*a* according to various techniques. In some examples, the information 220 may indicate (for example, include) a mapping that maps the first set of resources to the first set of uplink power control parameters and the second set of resources to the second set of uplink power control parameters or the set of power offsets. For example, the information 220 may include a bitmap corresponding to a third set of resources that includes (for example, spans) the first set of resources and the second set of resources. Each bit of the bitmap may correspond to a resource of the third set of resources and may indicate whether the UE 115-*a* is to use the first set of uplink power control parameters to determine a transmission power of an uplink message transmitted over the resource or to use the second set of uplink power control parameters or apply the set of power offsets to determine the transmission power. The first set of resources may correspond to the resources in which a corresponding bit indicates for the UE 115-*a* to use the first set of uplink power control parameters. The second set of resources may correspond to the resources in which a corresponding bit indicates for the UE 115-*a* to use the second set of uplink power control parameters or apply the set of power offsets.

In some examples, the information 220 may indicate a pattern of the first set of resources and the second set of resources. For example, the first set of resources and the second set of resources may be periodic resources, and the pattern may correspond to a periodicity of the first set of resources and the second set of resources. For instance, the pattern may indicate that the first set of resources occurs every first quantity of resources (for example, every first quantity of slots or symbols) and that the second set of resources occurs every second quantity of resources (for example, every second quantity of slots or symbols). For example, the first set of resources may correspond to a quantity of twenty slots that occurs every thirty slots, and the second set of resources may correspond to a quantity of ten slots that occurs every thirty slots. Here, the pattern may indicate every thirty slots, the first twenty slots may correspond to the first set of resources, and the next ten slots may correspond to the second set of resources, or vice versa. It is noted that any combination of quantities of periodic slots or symbols corresponding to the first set of resources and the second set of resources is possible.

In some examples, the information 220 may explicitly indicate the second set of resources and implicitly indicate the first set of resources. For example, a third set of resources may include the first set of resources and the second set of resources. The information 220 may indicate which resources of the third set of resources are included in the second set of resources, and the first set of resources may correspond to remaining resources of the third set of resources. For example, the remaining resources of the third set of resources may be configured as half-duplex resources at the base station 105-a (for example, resources over which the base station 105-a performs half-duplex communications) by default and full-duplex resources at the base station 105-a corresponding to the second set of resources may be indicated by the information 220. In some other examples, the information 220 may explicitly indicate the first set of resources and implicitly indicate the second set of resources. For example, the information may indicate which resources of the third set of resources are included in the first set of resources, and the second set of resources may correspond to the remaining resources of the third set of resources. For example, the remaining resources of the third set of resources may be configured as full-duplex resources at the base station 105-a (for example, resources over which the base station 105-a performs full-duplex communications) by default and half-duplex resources at the base station 105-a corresponding to the first set of resources may be indicated by the information 220.

In some examples, the information 220 may indicate that a next quantity of slots or symbols is associated with the second set of uplink power control parameters or the set of power offsets. For example, the base station 105-a may transmit the information 220 in DCI or a MAC-CE to dynamically indicate for the UE 115-a to use the second set of uplink power control parameters or to apply the set of power offsets to determine transmission powers of uplink messages for the next quantity of slots or symbols. Here, the next quantity of slots or symbols may correspond to the second set of resources and slots or symbols before and after the next quantity of slots or symbols may correspond to the first set of resources. For example, prior to receiving the information 220 and after the next quantity of slots or symbols indicated by the information 220, the UE 115-a may determine transmission powers of uplink messages using the first set of uplink power control parameters (for example, until the base station 105-a transmits additional information 220 to indicate a second next quantity of slots or symbols for the UE 115-a to use the second set of uplink power control parameters or to apply the set of power offsets).

In some examples, the information 220 may indicate that the next quantity of slots or symbols is associated with the first set of uplink power control parameters. For example, the base station 105-a may transmit the information 220 in DCI or a MAC-CE to dynamically indicate for the UE 115-a to use the first set of uplink power control parameters to determine transmission powers of uplink messages for the next quantity of slots or symbols. Here, the next quantity of slots or symbols may correspond to the first set of resources and slots or symbols before and after the next quantity of slots or symbols may correspond to the second set of resources.

In some examples, the operating mode of the base station 105-a (for example, whether the base station 105-a is in the full-duplex mode or the half-duplex mode) may be transparent (for example, unknown to the UE 115-a). For example, the information 220 may exclude an indication that the base station 105-a may perform half-duplex communications over the first set of resources and full-duplex communications over the second set of resources, and the UE 115-a may determine transmission powers for uplink messages in accordance with the information 220 without knowing the operating mode of the base station 105-a. In some other examples, the information 220 may indicate that the base station 105-a may perform half-duplex communications over the first set of resources and full-duplex communications over the second set of resources. In still some examples, the UE 115-a may be configured to determine that the base station 105-a may perform half-duplex communications over the first set of resources and full-duplex communications over the second set of resources.

In response to receiving the information 220, the UE 115-a may transmit uplink messages to the base station 105-a in accordance with the information 220. For example, the UE 115-a may transmit one or more uplink messages 225 (for example, an uplink message 225-a through an uplink message 225-n) over one or more resources of the second set of resources and may transmit one or more uplink messages 230 (for example, an uplink message 230-a through an uplink message 230-n) over one or more resources of the first set of resources. The UE 115-a may transmit the uplink messages 225 in accordance with the second set of uplink power control parameters or the set of power offsets (for example, having transmission powers determined using the second set of uplink power control parameters or the set of power offsets) and may transmit the uplink messages 230 in accordance with the first set of uplink power control parameters (for example, having transmission powers determined using the first set of uplink power control parameters).

The base station 105-a may perform half-duplex communications over the first set of resources and full-duplex communications over the second set of resources. For example, the base station 105-a may receive the uplink messages 230 over the first set of resources and refrain from transmitting downlink messages over the first set of resources. Additionally, the base station 105-a may receive the uplink messages 225 over the second set of resources and may concurrently transmit downlink messages over the second set of resources. In some examples, the base station 105-a may transmit one or more downlink messages 240 (for example, a downlink message 240-a through a downlink message 240-n) to the UE 115-b over the second set of resources. Here, the base station 105-a may operate in the full-duplex mode, and each of the UE 115-a and the UE 115-b may operate in the half-duplex mode. In some other examples, the UE 115-a may also operate in the full-duplex mode over the second set of resources. Here, the base station 105-a may transmit one or more downlink messages 235 (for example, a downlink message 235-a through a downlink message 235-n) to the UE 115-a over the second set of resources concurrent with receiving the one or more uplink messages 225 from the UE 115-a over the second set of resources.

Figure 3:
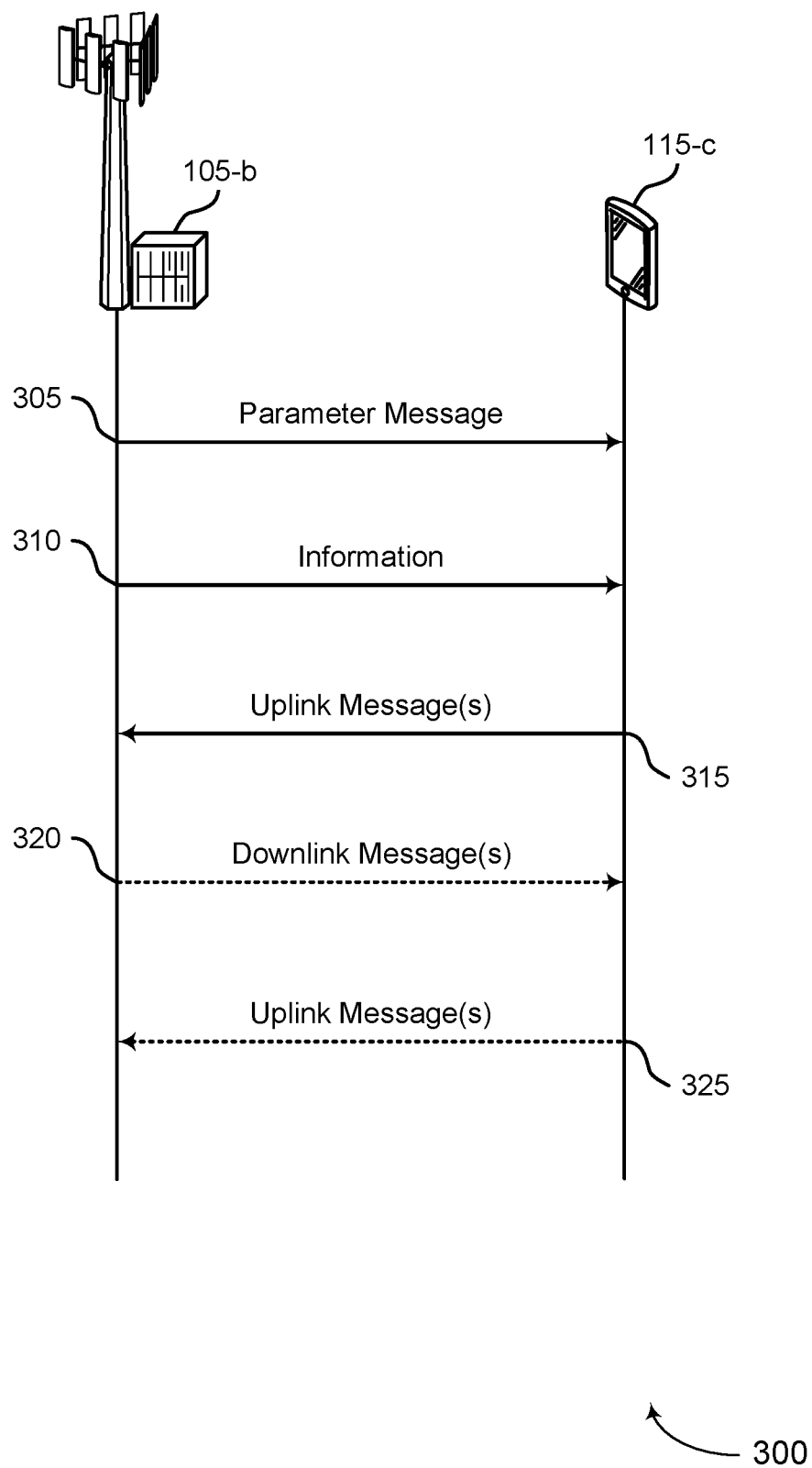
FIGS. 3 and 4 illustrates an example of process flows that support techniques for uplink power control in accordance with aspects of the present disclosure.

FIG. 3 illustrates an example of a process flow 300 that supports techniques for uplink power control in accordance with aspects of the present disclosure. In some examples, the process flow 300 may be implemented by aspects of the wireless communications systems 100 and 200 as described with reference to FIGS. 1 and 2. For example, the process flow 300 may be implemented by a base station 105-b and a UE 115-c to support uplink power control for half-duplex and full-duplex communications. The process flow 300 may further be implemented by the base station 105-b and the UE 115-c to provide improvements to reliability, data rates, spectral efficiency, latency, power consumption, coordination between devices, resource utilization, and latency, among other benefits.

The base station 105-b and the UE 115-c may be examples of a base station 105 and a UE 115 described with reference to FIGS. 1 and 2. In the following description of the process flow 300, the operations between the base station 105-b and the UE 115-c may be communicated in a different order than the example order shown, or the operations performed by the base station 105-b and the UE 115-c may be performed in different orders or at different times. Some operations may also be omitted from the process flow 300, and other operations may be added to the process flow 300.

At 305, the base station 105-b may transmit a parameter message to the UE 115-c to configure the UE 115-c with a first set of uplink power control parameters and a second set of uplink power control parameters. For example, the parameter message may include a first indication of the first set of uplink power control parameters and a second indication of the second set of uplink power control parameters. The first set of uplink power control parameters may be associated with half-duplex communications at the base station 105-b, and the second set of uplink power control parameters may be associated with full-duplex communications at the base station 105-b. That is, the UE 115-c may use the first set of uplink power control parameters to determine transmission powers of uplink messages while the base station 105-b operates in a half-duplex mode and may use the second set of uplink power control parameters to determine the transmission powers while the base station 105-b operates in a full-duplex mode (for example, irrespective of whether the UE 115-c operates in the half-duplex mode or the full-duplex mode). In some examples, the base station 105-b may transmit the parameter message via RRC signaling.

At 310, the base station 105-b may transmit information (for example, via DCI, a MAC-CE, or RRC signaling) to the UE 115-c that is indicative of a first set of resources associated with the first set of uplink power control parameters and a second set of resources associated with the second set of uplink power control parameters. In some implementations, the information may include a mapping (for example, a bitmap) that maps that first set of resources to the first set of uplink power control parameters and the second set of resources to the second set of uplink power control parameters. In some implementations, the information may indicate respective periodicities of the first set of resources and the second set of resources. For example, the information may indicate a periodic pattern of the first set of resources and the second set of resources. In some implementations, the first set of resources and the second set of resources may be included in a third set of resources, and the information may indicate either the first set of resources or the second set of resources. Here, remaining resources of the third set of resources may correspond to the unindicated set of resources (for example, the first set of resources for the example in which the information indicates the second set of resources, or vice versa). In some implementations, the information may indicate that the first set of resources are for half-duplex communications at the base station and that the second set of resources are for full-duplex communications at the base station. In some implementations, the information may indicate a next quantity of slots or symbols over which the UE 115-c is to use the second set of uplink power control parameters, and the next quantity of slots or symbols corresponds to the second set of resources.

At 315, the UE 115-c may transmit one or more uplink messages to the base station 105-b over one or more resources of the second set of resources and in accordance with the second set of uplink power control parameters. For example, in response to receiving the information, the UE 115-c may determine whether an uplink message is to be transmitted over the first set of resources or the second set of resources. For uplink messages transmitted over the second set of resources, the UE 115-c may use the second set of uplink power control parameters to determine a transmission power of the uplink messages and may transmit the uplink messages to the base station 105-b over the resources of the second set of resources and according to the determined transmission power.

At 320, the base station 105-b may transmit one or more downlink messages to the UE 115-c over one or more resources of the second set of resources concurrent with receiving the one or more uplink messages over the second set of resources. For example, in some implementations, both of the UE 115-c and the base station 105-b may operate in the full-duplex mode. Here, the UE 115-c and the base station 105-b may concurrently communicate the downlink messages and the uplink messages over the second set of resources.

At 325, the UE 115-c may transmit one or more uplink messages to the base station 105-b over one or more resources of the first set of resources and in accordance with the first set of uplink power control parameters. For example, in response to receiving the information, the UE 115-c may determine whether an uplink message is to be transmitted over the first set of resources or the second set of resources. For uplink messages transmitted over the first set of resources, the UE 115-c may use the first set of uplink power control parameters to determine a transmission power of the uplink messages and may transmit the uplink messages to the base station 105-b over the resources of the first set of resources and according to the determined transmission power.

Figure 4:
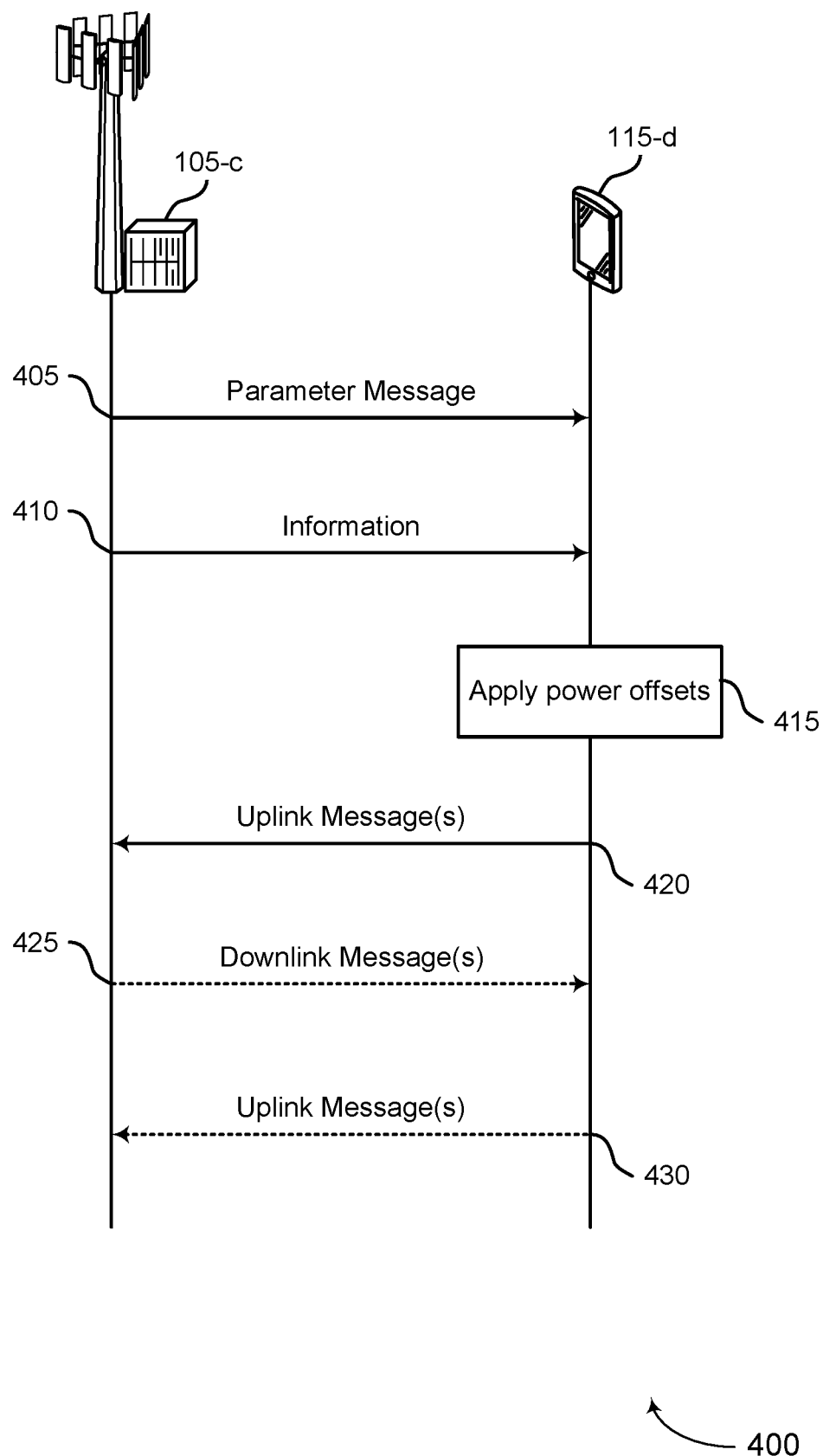

FIG. 4 illustrates an example of a process flow 400 that supports techniques for uplink power control in accordance with aspects of the present disclosure. In some examples, the process flow 400 may be implemented by aspects of the wireless communications systems 100 and 200 as described with reference to FIGS. 1 and 2. For example, the process flow 400 may be implemented by a base station 105-c and a UE 115-d to support uplink power control for half-duplex and full-duplex communications. The process flow 400 may further be implemented by the base station 105-c and the UE 115-d to provide improvements to reliability, data rates, spectral efficiency, latency, power consumption, coordination between devices, resource utilization, and latency, among other benefits.

The base station 105-c and the UE 115-d may be examples of a base station 105 and a UE 115 described with reference to FIGS. 1 and 2. In the following description of the process flow 400, the operations between the base station 105-c and the UE 115-d may be communicated in a different order than the example order shown, or the operations performed by the base station 105-c and the UE 115-d may be performed in different orders or at different times. Some operations may also be omitted from the process flow 400, and other operations may be added to the process flow 400.

At 405, the base station 105-c may transmit a parameter message (for example, via RRC signaling) to the UE 115-d to configure the UE 115-d with a set of uplink power control parameters associated with half-duplex communications at the base station 105-c and a set of power offsets associated with full-duplex communications at the base station 105-c. For example, the parameter message may include a first indication of the set of uplink power control parameters and a second indication of the set of power offsets. The UE 115-d may use the set of uplink power control parameters to determine transmission powers of uplink messages while the base station 105-c operates in a half-duplex mode and may apply the set of power offsets to the set of uplink power control parameters to determine the transmission powers while the base station 105-c operates in a full-duplex mode (for example, irrespective of whether the UE 115-d operates in the half-duplex mode or the full-duplex mode).

At 410, the base station 105-c may transmit information (for example, via DCI, a MAC-CE, or RRC signaling) to the UE 115-d that is indicative of a first set of resources associated with the set of uplink power control parameters and a second set of resources over which to apply the set of power offsets to the set of uplink power control parameters. In some implementations, the information may include a mapping (for example, a bitmap) that maps that first set of resources to the set of uplink power control parameters and the second set of resources to the set of power offsets. In some implementations, the information may indicate respective periodicities of the first set of resources and the second set of resources. For example, the information may indicate a periodic pattern of the first set of resources and the second set of resources. In some implementations, the first set of resources and the second set of resources may be included in a third set of resources, and the information may indicate either the first set of resources or the second set of resources. Here, remaining resources of the third set of resources may correspond to the unindicated set of resources (for example, the first set of resources for the example in which the information indicates the second set of resources, or vice versa). In some implementations, the information may indicate that the first set of resources are for half-duplex communications at the base station and that the second set of resources are for full-duplex communications at the base station. In some implementations, the information may indicate a next quantity of slots or symbols over which the UE 115-d is to apply the set of power offsets to the set of uplink power control parameters, and the next quantity of slots or symbols corresponds to the second set of resources.

At 415, the UE 115-d may apply the set of power offsets to the set of uplink power control parameters to determine transmission powers of one or more uplink messages to be transmitted over the second set of resources. In some implementations, the UE 115-d may determine an initial transmission power of an uplink message using the set of uplink power control parameters and may apply the set of power offsets to the initial transmission power to determine a final transmission power of the uplink message. For example, the set of power offsets may boost (for example, increase) the initial transmission power to the final transmission power in order to increase a reliability of uplink message and compensate for self-interference associated with full-duplex communications at the base station 105-c. In some implementations, the UE 115-d may apply the set of power offsets to one or more uplink power control parameters of the set of uplink power control parameters. For example, power offsets of the set of power offsets may correspond to an uplink power control parameter of the set of uplink power control parameters and may boost (for example, increase) a value of the corresponding uplink power control parameter to boost a transmission power of an uplink message determined using the set of uplink power control parameters. In some implementations, a power offset of the set of power offsets may correspond to (for example, be applied to) an individual uplink power control parameter (for example, $P_{OPUSCH,b,f,c}(j)$, $M_{RB,b,f,c}^{PUSCH}(i)$, and so on). In some examples, one or more of the power offsets may correspond to (for example, be applied to) a combination of uplink power control parameters (for example, $\alpha_{b,f,c}(j)*PL_{b,f,c}(q_d)$, among other combinations of uplink power control parameters).

At 420, the UE 115-d may transmit the one or more uplink messages to the base station 105-c over one or more resources of the second set of resources and in accordance with the applied set of power offsets. For example, the UE 115-d may transmit the one or more uplink messages according to the transmission powers determined by applying the set of power offsets to the set of uplink power control parameters.

At 425, the base station 105-c may transmit one or more downlink messages to the UE 115-d over one or more resources of the second set of resources concurrent with receiving the one or more uplink messages over the second set of resources. For example, in some implementations, both of the UE 115-d and the base station 105-c may operate in the full-duplex mode. Here, the UE 115-d and the base station 105-c may concurrently communicate the downlink messages and the uplink messages over the second set of resources.

At 430, the UE 115-d may transmit one or more uplink messages to the base station 105-c over one or more resources of the first set of resources and in accordance with the set of uplink power control parameters. For example, in response to receiving the information, the UE 115-d may determine whether an uplink message is to be transmitted over the first set of resources or the second set of resources. For uplink messages transmitted over the first set of resources, the UE 115-d may use the set of uplink power control parameters to determine a transmission power of the uplink messages and may transmit the uplink messages to the base station 105-c over the resources of the first set of resources and according to the determined transmission power.

Figure 5:
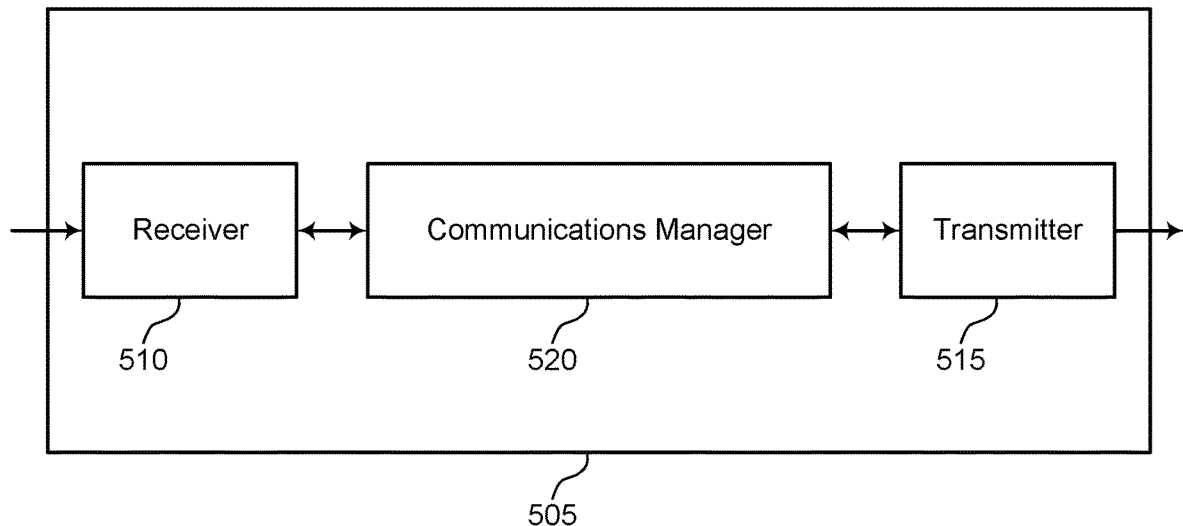
FIGS. 5 and 6 show block diagrams of devices that support techniques for uplink power control in accordance with aspects of the present disclosure.

FIG. 5 shows a block diagram of a device 505 that supports techniques for uplink power control in accordance with aspects of the present disclosure. The device 505 may be an example of aspects of a UE 115 as described herein. The device 505 may include a receiver 510, a transmitter 515, and a communications manager 520. The communications manager 520 can be implemented, at least in part, by one or both of a modem and processor. Each of these components may be in communication with one another (for example, via one or more buses).

The receiver 510 may provide a means for receiving information such as packets, user data, control information, or any combination thereof associated with various information channels (for example, control channels, data channels, information channels related to techniques for uplink power control). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to techniques for uplink power control). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for uplink power control as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 520 may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a first indication of a first set of uplink power control parameters associated with half-duplex communications at the base station and a second indication of a second set of uplink power control parameters associated with full-duplex communications at the base station. The communications manager 520 may be configured as or otherwise support a means for receiving, from the base station, information indicative of a first set of resources associated with the first set of uplink power control parameters and a second set of resources associated with the second set of uplink power control parameters. The communications manager 520 may be configured as or otherwise support a means for transmitting, to the base station and based on the information, one or more uplink messages over one or more resources of the second set of resources in accordance with the second set of uplink power control parameters.

Additionally or alternatively, the communications manager 520 may support wireless communication at a UE in accordance with examples as disclosed herein. For example, the communications manager 520 may be configured as or otherwise support a means for receiving, from a base station, a first indication of a set of uplink power control parameters associated with half-duplex communications at the base station and a second indication of a set of power offsets associated with full-duplex communications at the base station. The communications manager 520 may be configured as or otherwise support a means for receiving, from the base station, information indicative of a first set of resources associated with the set of uplink power control parameters and a second set of resources over which to apply the set of power offsets to the set of uplink power control parameters. The communications manager 520 may be configured as or otherwise support a means for transmitting, to the base station and based on the information, one or more uplink messages over one or more resources of the second set of resources in accordance with the set of uplink power control parameters and the applied set of power offsets.

By including or configuring the communications manager 520 in accordance with examples as described herein, the device 505 (for example, a processor controlling or otherwise coupled to the receiver 510, the transmitter 515, the communications manager 520, or a combination thereof) may support techniques for improved power consumption and efficient utilization of communication resources, for example, by supporting uplink power control for both half-duplex and full-duplex communications.

Figure 6:
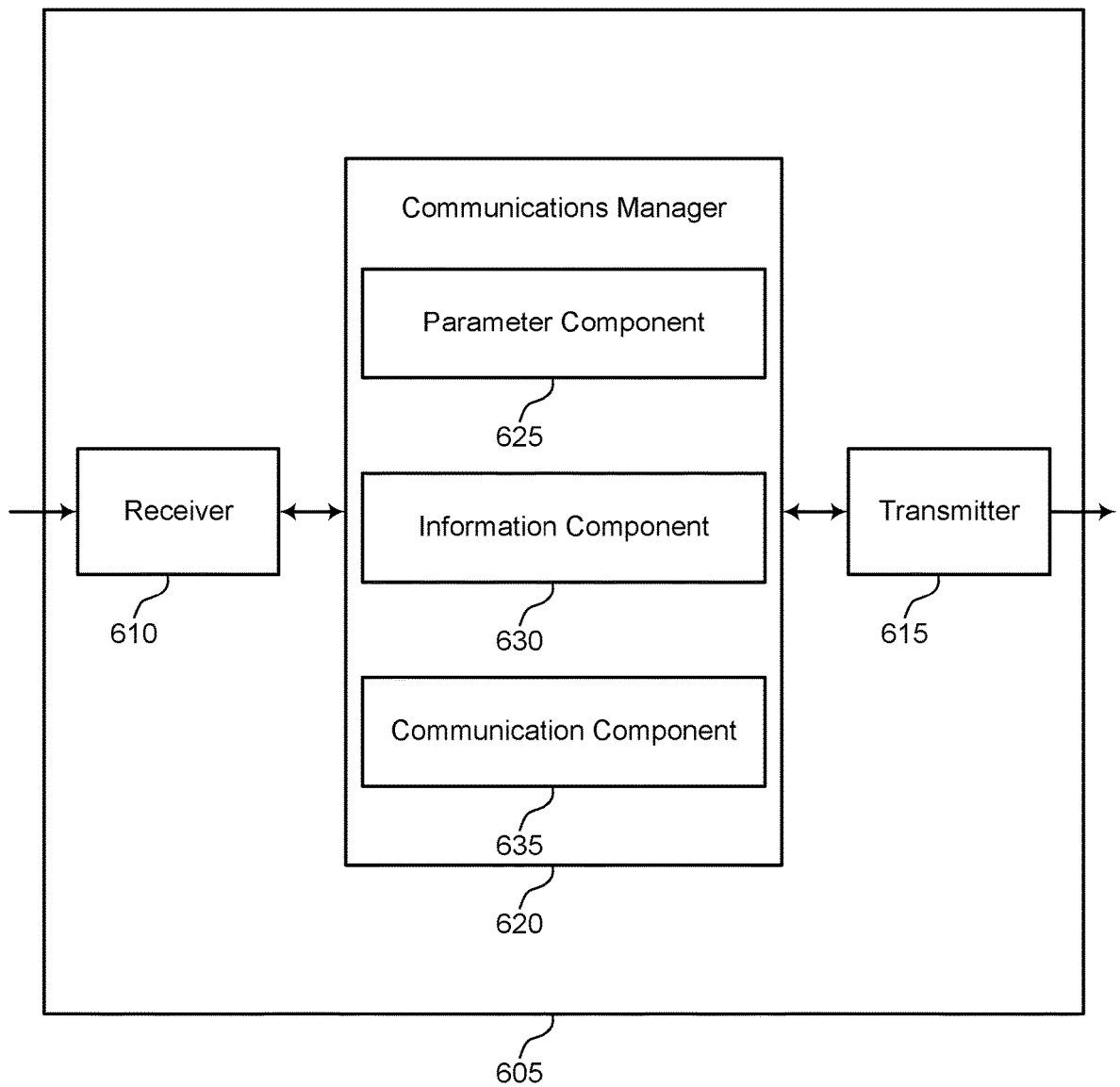

FIG. 6 shows a block diagram of a device 605 that supports techniques for uplink power control in accordance with aspects of the present disclosure. The device 605 may be an example of aspects of a device 505 or a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to techniques for uplink power control). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to techniques for uplink power control). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for uplink power control as described herein. For example, the communications manager 620 may include a parameter component 625, an information component 630, a communication component 635, or any combination thereof. In some examples, the communications manager 620, or various components thereof, may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The parameter component 625 may be configured as or otherwise support a means for receiving, from a base station, a first indication of a first set of uplink power control parameters associated with half-duplex communications at the base station and a second indication of a second set of uplink power control parameters associated with full-duplex communications at the base station. The information component 630 may be configured as or otherwise support a means for receiving, from the base station, information indicative of a first set of resources associated with the first set of uplink power control parameters and a second set of resources associated with the second set of uplink power control parameters. The communication component 635 may be configured as or otherwise support a means for transmitting, to the base station and based on the information, one or more uplink messages over one or more resources of the second set of resources in accordance with the second set of uplink power control parameters.

Additionally or alternatively, the communications manager 620 may support wireless communication at a UE in accordance with examples as disclosed herein. The parameter component 625 may be configured as or otherwise support a means for receiving, from a base station, a first indication of a set of uplink power control parameters associated with half-duplex communications at the base station and a second indication of a set of power offsets associated with full-duplex communications at the base station. The information component 630 may be configured as or otherwise support a means for receiving, from the base station, information indicative of a first set of resources associated with the set of uplink power control parameters and a second set of resources over which to apply the set of power offsets to the set of uplink power control parameters. The communication component 635 may be configured as or otherwise support a means for transmitting, to the base station and based on the information, one or more uplink messages over one or more resources of the second set of resources in accordance with the set of uplink power control parameters and the applied set of power offsets.

Figure 7:
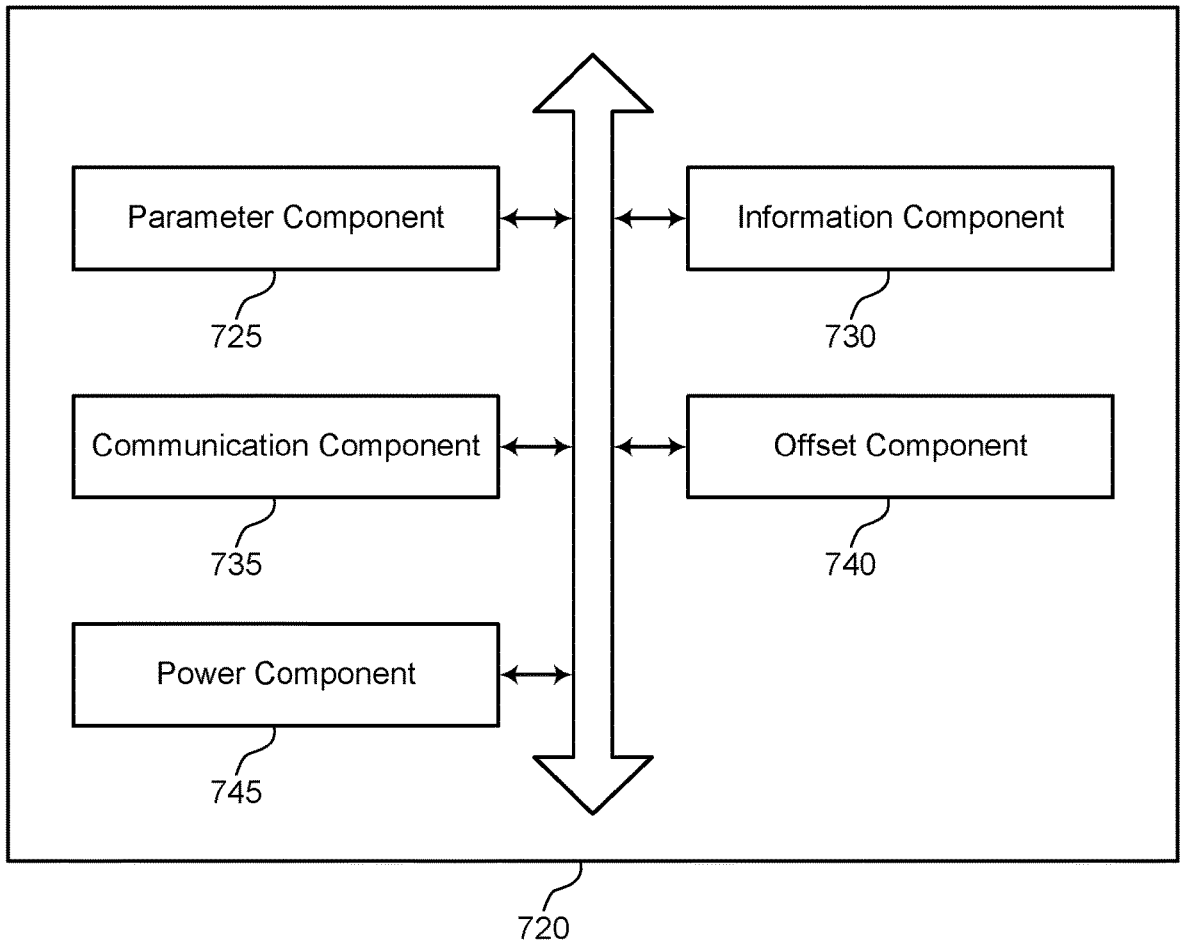
FIG. 7 shows a block diagram of a communications manager that supports techniques for uplink power control in accordance with aspects of the present disclosure.

FIG. 7 shows a block diagram of a communications manager 720 that supports techniques for uplink power control in accordance with aspects of the present disclosure. The communications manager 720, or various components thereof, may be an example of means for performing various aspects of techniques for uplink power control as described herein. For example, the communications manager 720 may include a parameter component 725, an information component 730, a communication component 735, an offset component 740, a power component 745, or any combination thereof. Each of these components may communicate, directly or indirectly, with one another (for example, via one or more buses).

The communications manager 720 may support wireless communication at a UE in accordance with examples as disclosed herein. The parameter component 725 may be configured as or otherwise support a means for receiving, from a base station, a first indication of a first set of uplink power control parameters associated with half-duplex communications at the base station and a second indication of a second set of uplink power control parameters associated with full-duplex communications at the base station. The information component 730 may be configured as or otherwise support a means for receiving, from the base station, information indicative of a first set of resources associated with the first set of uplink power control parameters and a second set of resources associated with the second set of uplink power control parameters. The communication component 735 may be configured as or otherwise support a means for transmitting, to the base station and based on the information, one or more uplink messages over one or more resources of the second set of resources in accordance with the second set of uplink power control parameters.

In some examples, the information indicates a mapping that maps the first set of resources to the first set of uplink power control parameters and the second set of resources to the second set of uplink power control parameters. In some examples, transmitting the one or more uplink messages is in accordance with the mapping.

In some examples, the information indicates a pattern of the first set of resources and the second set of resources, the pattern corresponding to a first periodicity of the first set of resources and a second periodicity of the second set of resources. In some examples, transmitting the one or more uplink messages is in accordance with the pattern.

In some examples, the information indicates the second set of resources as a subset of a third set of resources that includes the first set of resources and the second set of resources, the first set of resources corresponding to a remaining set of resources of the third set of resources other than the second set of resources.

In some examples, the information indicates the first set of resources as a subset of a third set of resources that includes the first set of resources and the second set of resources, the second set of resources corresponding to a remaining set of resources of the third set of resources other than the first set of resources.

In some examples, the information indicates that the first set of resources are for half-duplex communications at the base station and the second set of resources are for full-duplex communications at the base station.

In some examples, the information indicates for the UE to use the second set of uplink power control parameters for a next quantity of slots or symbols, the second set of resources corresponding to the next quantity of slots or symbols.

In some examples, to support receiving the information, the information component 730 may be configured as or otherwise support a means for receiving, from the base station, the information in DCI, a MAC-CE, or RRC signaling.

In some examples, the communication component 735 may be configured as or otherwise support a means for transmitting, to the base station and based on the information, one or more second uplink messages over one or more resources of the first set of resources in accordance with the first set of uplink power control parameters.

In some examples, the second set of uplink power control parameters are associated with uplink messages having a higher transmission power than uplink messages associated with the first set of uplink power control parameters.

In some examples, the communication component 735 may be configured as or otherwise support a means for receiving, from the base station, one or more downlink messages over the one or more resources of the second set of resources, where the one or more downlink messages and the one or more uplink messages are communicated concurrently.

Additionally or alternatively, the communications manager 720 may support wireless communication at a UE in accordance with examples as disclosed herein. In some examples, the parameter component 725 may be configured as or otherwise support a means for receiving, from a base station, a first indication of a set of uplink power control parameters associated with half-duplex communications at the base station and a second indication of a set of power offsets associated with full-duplex communications at the base station. In some examples, the information component 730 may be configured as or otherwise support a means for receiving, from the base station, information indicative of a first set of resources associated with the set of uplink power control parameters and a second set of resources over which to apply the set of power offsets to the set of uplink power control parameters. In some examples, the communication component 735 may be configured as or otherwise support a means for transmitting, to the base station and based on the information, one or more uplink messages over one or more resources of the second set of resources in accordance with the set of uplink power control parameters and the applied set of power offsets.

In some examples, the information indicates a mapping that maps the first set of resources to the set of uplink power control parameters and the second set of resources to the set of power offsets. In some examples, transmitting the one or more uplink messages is in accordance with the mapping.

In some examples, the information indicates a pattern of the first set of resources and the second set of resources, the pattern corresponding to a first periodicity of the first set of resources and a second periodicity of the second set of resources. In some examples, transmitting the one or more uplink messages is in accordance with the pattern.

In some examples, the information indicates the second set of resources as a subset of a third set of resources that includes the first set of resources and the second set of resources, the first set of resources corresponding to a remaining set of resources of the third set of resources other than the second set of resources.

In some examples, the information indicates the first set of resources as a subset of a third set of resources that includes the first set of resources and the second set of resources, the second set of resources corresponding to a remaining set of resources of the third set of resources other than the first set of resources.

In some examples, the information indicates that the first set of resources are for half-duplex communications at the base station and the second set of resources are for full-duplex communications at the base station.

In some examples, the information indicates for the UE to apply the set of power offsets for a next quantity of slots or symbols, the second set of resources corresponding to the next quantity of slots or symbols.

In some examples, to support receiving the information, the information component 730 may be configured as or otherwise support a means for receiving, from the base station, the information in DCI, a MAC-CE, or RRC signaling.

In some examples, the offset component 740 may be configured as or otherwise support a means for applying the set of power offsets to one or more uplink power control parameters of the set of uplink power control parameters based on the information, where a transmission power of the one or more uplink messages is based on applying the set of power offsets to the one or more uplink power control parameters.

In some examples, the power component 745 may be configured as or otherwise support a means for determining a transmission power of the one or more uplink messages using the set of uplink power control parameters. In some examples, the offset component 740 may be configured as or otherwise support a means for applying the set of power offsets to the transmission power based on the information, where transmitting the one or more uplink messages is based on applying the set of power offsets to the transmission power.

In some examples, the communication component 735 may be configured as or otherwise support a means for transmitting, to the base station and based on the information, one or more second uplink messages over one or more resources of the first set of resources in accordance with the set of uplink power control parameters.

In some examples, the communication component 735 may be configured as or otherwise support a means for receiving, from the base station, one or more downlink messages over the one or more resources of the second set of resources, where the one or more downlink messages and the one or more uplink messages are communicated concurrently.

Figure 8:
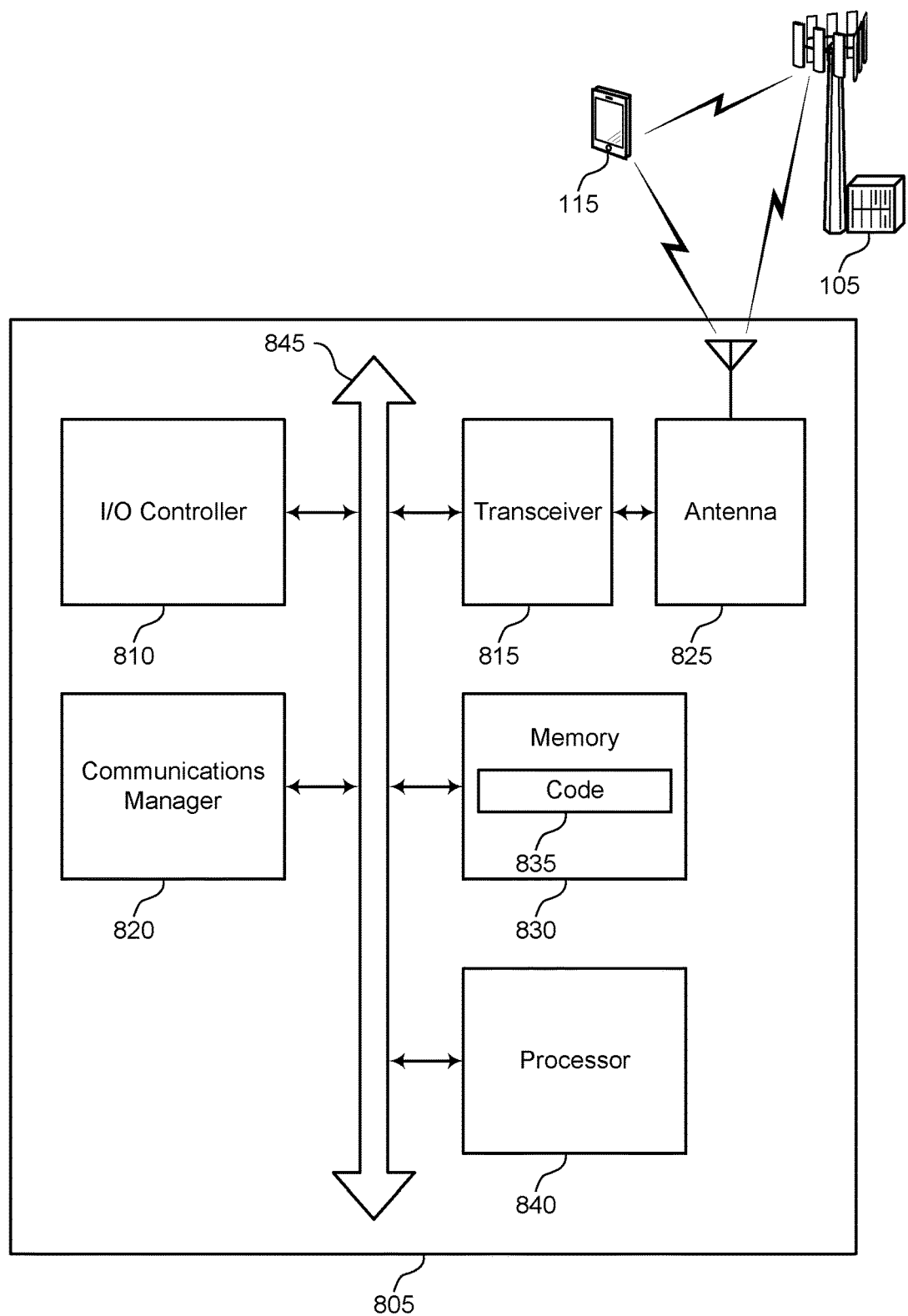
FIG. 8 shows a diagram of a system including a device that supports techniques for uplink power control in accordance with aspects of the present disclosure.

FIG. 8 shows a diagram of a system including a device 805 that supports techniques for uplink power control in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein. In some examples, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting techniques for uplink power control). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a first indication of a first set of uplink power control parameters associated with half-duplex communications at the base station and a second indication of a second set of uplink power control parameters associated with full-duplex communications at the base station. The communications manager 820 may be configured as or otherwise support a means for receiving, from the base station, information indicative of a first set of resources associated with the first set of uplink power control parameters and a second set of resources associated with the second set of uplink power control parameters. The communications manager 820 may be configured as or otherwise support a means for transmitting, to the base station and based on the information, one or more uplink messages over one or more resources of the second set of resources in accordance with the second set of uplink power control parameters.

Additionally or alternatively, the communications manager 820 may support wireless communication at a UE in accordance with examples as disclosed herein. For example, the communications manager 820 may be configured as or otherwise support a means for receiving, from a base station, a first indication of a set of uplink power control parameters associated with half-duplex communications at the base station and a second indication of a set of power offsets associated with full-duplex communications at the base station. The communications manager 820 may be configured as or otherwise support a means for receiving, from the base station, information indicative of a first set of resources associated with the set of uplink power control parameters and a second set of resources over which to apply the set of power offsets to the set of uplink power control parameters. The communications manager 820 may be configured as or otherwise support a means for transmitting, to the base station and based on the information, one or more uplink messages over one or more resources of the second set of resources in accordance with the set of uplink power control parameters and the applied set of power offsets.

By including or configuring the communications manager 820 in accordance with examples as described herein, the device 805 may support techniques for improved reliability, data rates, spectral efficiency, latency, power consumption, battery life, coordination between devices, and resource utilization, among other benefits.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for uplink power control as described herein, or the processor 840 and the memory 830 may be otherwise configured to perform or support such operations.

Figure 9:
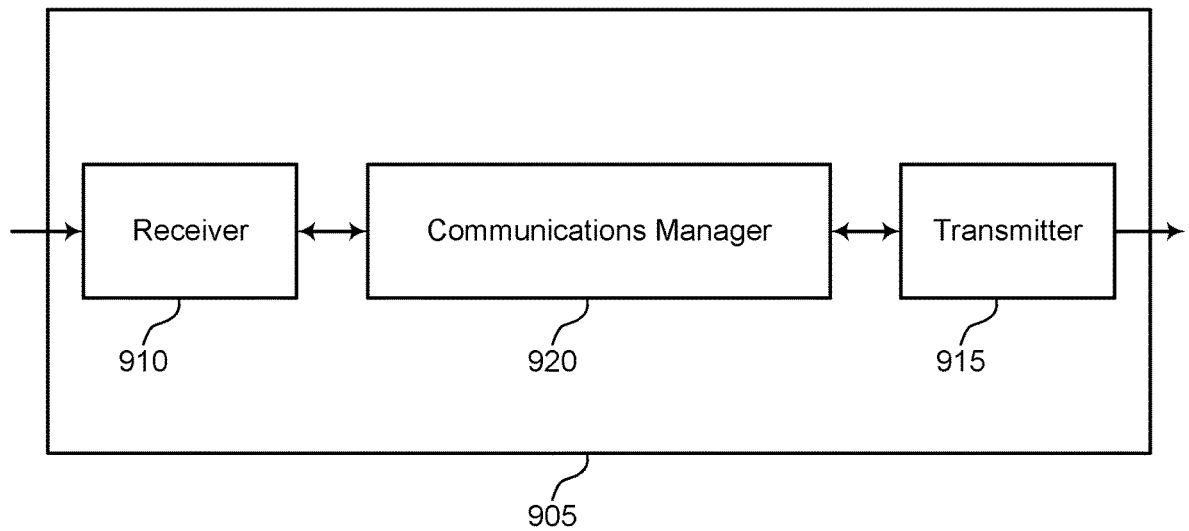
FIGS. 9 and 10 show block diagrams of devices that support techniques for uplink power control in accordance with aspects of the present disclosure.

FIG. 9 shows a block diagram of a device 905 that supports techniques for uplink power control in accordance with aspects of the present disclosure. The device 905 may be an example of aspects of a base station 105 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to techniques for uplink power control). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to techniques for uplink power control). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for uplink power control as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a first indication of a first set of uplink power control parameters associated with half-duplex communications at the base station and a second indication of a second set of uplink power control parameters associated with full-duplex communications at the base station. The communications manager 920 may be configured as or otherwise support a means for transmitting, to the UE, information indicative of a first set of resources associated with the first set of uplink power control parameters and a second set of resources associated with the second set of uplink power control parameters. The communications manager 920 may be configured as or otherwise support a means for receiving, from the UE and based on the information, one or more uplink messages over one or more resources of the second set of resources in accordance with the second set of uplink power control parameters.

Additionally or alternatively, the communications manager 920 may support wireless communication at a base station in accordance with examples as disclosed herein. For example, the communications manager 920 may be configured as or otherwise support a means for transmitting, to a UE, a first indication of a set of uplink power control parameters associated with half-duplex communications at the base station and a second indication of a set of power offsets associated with full-duplex communications at the base station. The communications manager 920 may be configured as or otherwise support a means for transmitting, to the UE, information indicative of a first set of resources associated with the set of uplink power control parameters and a second set of resources over which to apply the set of power offsets to the set of uplink power control parameters. The communications manager 920 may be configured as or otherwise support a means for receiving, from the UE and based on the information, one or more uplink messages over one or more resources of the second set of resources in accordance with the set of uplink power control parameters and the applied set of power offsets.

By including or configuring the communications manager 920 in accordance with examples as described herein, the device 905 (for example, a processor controlling or otherwise coupled to the receiver 910, the transmitter 915, the communications manager 920, or a combination thereof) may support techniques for improved power consumption and efficient utilization of communication resources, for example, by supporting uplink power control for both half-duplex and full-duplex communications.

Figure 10:
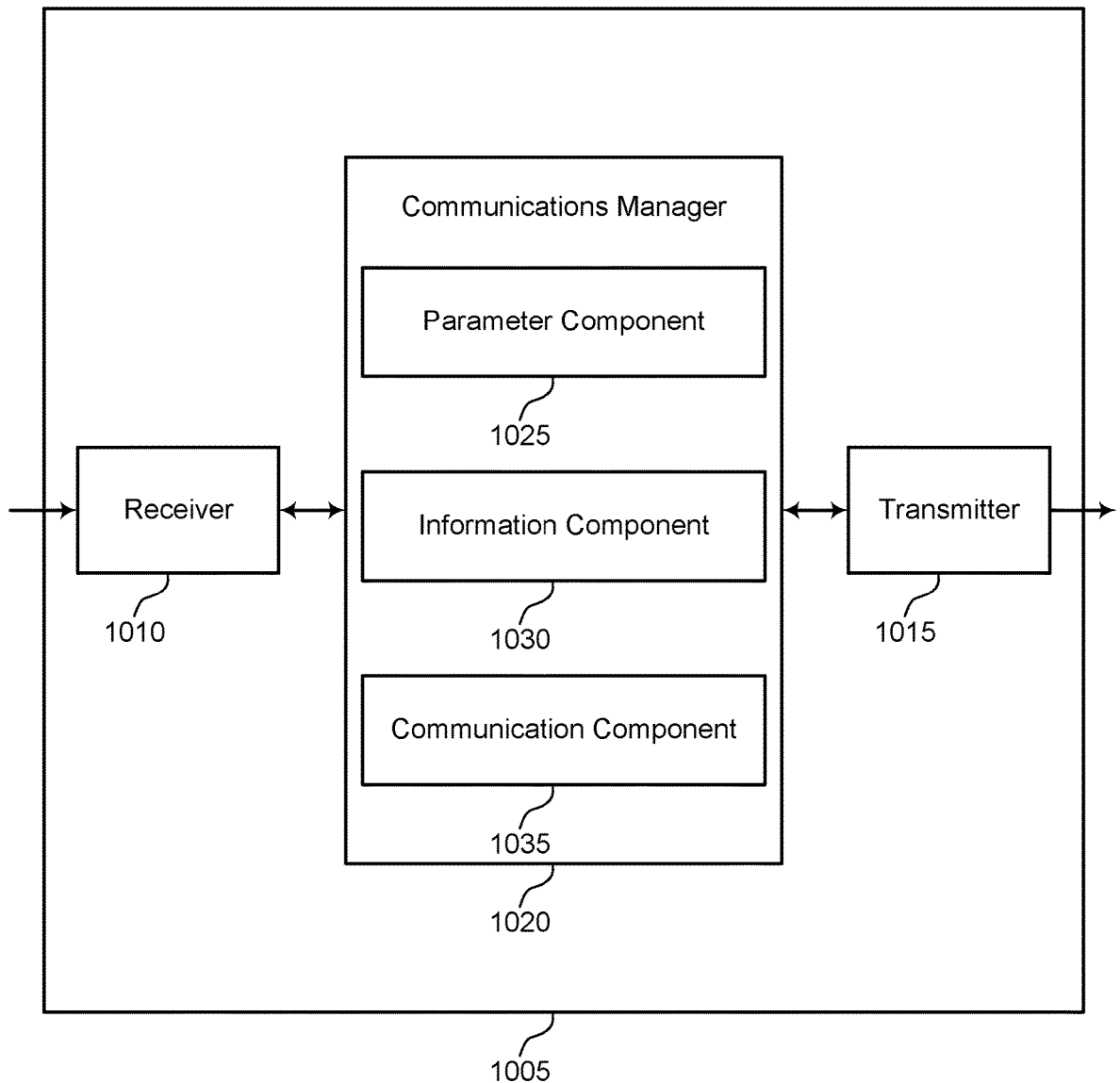

FIG. 10 shows a block diagram of a device 1005 that supports techniques for uplink power control in accordance with aspects of the present disclosure. The device 1005 may be an example of aspects of a device 905 or a base station 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to techniques for uplink power control). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to techniques for uplink power control). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for uplink power control as described herein. For example, the communications manager 1020 may include a parameter component 1025, an information component 1030, a communication component 1035, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The parameter component 1025 may be configured as or otherwise support a means for transmitting, to a UE, a first indication of a first set of uplink power control parameters associated with half-duplex communications at the base station and a second indication of a second set of uplink power control parameters associated with full-duplex communications at the base station. The information component 1030 may be configured as or otherwise support a means for transmitting, to the UE, information indicative of a first set of resources associated with the first set of uplink power control parameters and a second set of resources associated with the second set of uplink power control parameters. The communication component 1035 may be configured as or otherwise support a means for receiving, from the UE and based on the information, one or more uplink messages over one or more resources of the second set of resources in accordance with the second set of uplink power control parameters.

Additionally or alternatively, the communications manager 1020 may support wireless communication at a base station in accordance with examples as disclosed herein. The parameter component 1025 may be configured as or otherwise support a means for transmitting, to a UE, a first indication of a set of uplink power control parameters associated with half-duplex communications at the base station and a second indication of a set of power offsets associated with full-duplex communications at the base station. The information component 1030 may be configured as or otherwise support a means for transmitting, to the UE, information indicative of a first set of resources associated with the set of uplink power control parameters and a second set of resources over which to apply the set of power offsets to the set of uplink power control parameters. The communication component 1035 may be configured as or otherwise support a means for receiving, from the UE and based on the information, one or more uplink messages over one or more resources of the second set of resources in accordance with the set of uplink power control parameters and the applied set of power offsets.

Figure 11:
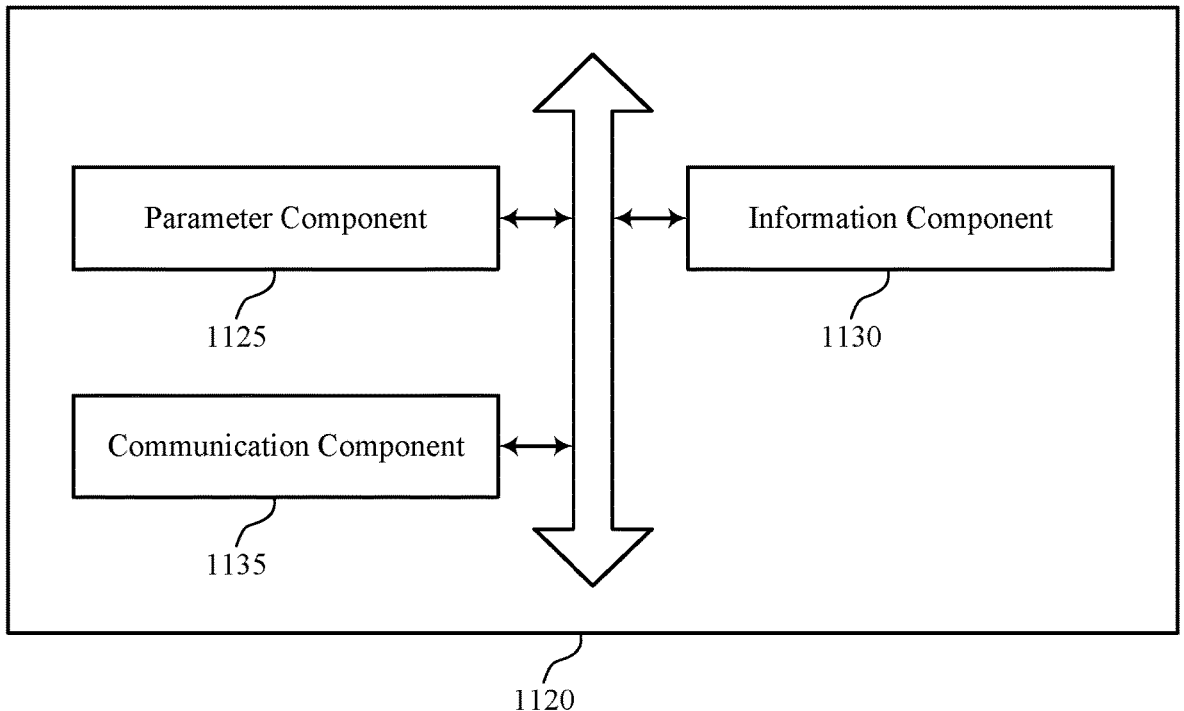
FIG. 11 shows a block diagram of a communications manager that supports techniques for uplink power control in accordance with aspects of the present disclosure.

FIG. 11 shows a block diagram of a communications manager 1120 that supports techniques for uplink power control in accordance with aspects of the present disclosure. The communications manager 1120, or various components thereof, may be an example of means for performing various aspects of techniques for uplink power control as described herein. For example, the communications manager 1120 may include a parameter component 1125, an information component 1130, a communication component 1135, or any combination thereof. Each of these components may communicate, directly or indirectly, with one another (for example, via one or more buses).

The communications manager 1120 may support wireless communication at a base station in accordance with examples as disclosed herein. The parameter component 1125 may be configured as or otherwise support a means for transmitting, to a UE, a first indication of a first set of uplink power control parameters associated with half-duplex communications at the base station and a second indication of a second set of uplink power control parameters associated with full-duplex communications at the base station. The information component 1130 may be configured as or otherwise support a means for transmitting, to the UE, information indicative of a first set of resources associated with the first set of uplink power control parameters and a second set of resources associated with the second set of uplink power control parameters. The communication component 1135 may be configured as or otherwise support a means for receiving, from the UE and based on the information, one or more uplink messages over one or more resources of the second set of resources in accordance with the second set of uplink power control parameters.

In some examples, the information indicates a mapping that maps the first set of resources to the first set of uplink power control parameters and the second set of resources to the second set of uplink power control parameters. In some examples, the one or more uplink messages is in accordance with the mapping.

In some examples, the information indicates a pattern of the first set of resources and the second set of resources, the pattern corresponding to a first periodicity of the first set of resources and a second periodicity of the second set of resources. In some examples, receiving the one or more uplink messages is in accordance with the pattern.

In some examples, the information indicates the second set of resources as a subset of a third set of resources that includes the first set of resources and the second set of resources, the first set of resources corresponding to a remaining set of resources of the third set of resources other than the second set of resources.

In some examples, the information indicates the first set of resources as a subset of a third set of resources that includes the first set of resources and the second set of resources, the second set of resources corresponding to a remaining set of resources of the third set of resources other than the first set of resources.

In some examples, the information indicates that the first set of resources are for half-duplex communications at the base station and the second set of resources are for full-duplex communications at the base station.

In some examples, the information indicates for the UE to use the second set of uplink power control parameters for a next quantity of slots or symbols, the second set of resources corresponding to the next quantity of slots or symbols.

In some examples, to support transmitting the information, the information component 1130 may be configured as or otherwise support a means for transmitting, to the UE, the information in DCI, a MAC-CE, or RRC signaling.

In some examples, the communication component 1135 may be configured as or otherwise support a means for receiving, from the UE and based on the information, one or more second uplink messages over one or more resources of the first set of resources in accordance with the first set of uplink power control parameters.

In some examples, the second set of uplink power control parameters are associated with uplink messages having a higher transmission power than uplink messages associated with the first set of uplink power control parameters.

In some examples, the communication component 1135 may be configured as or otherwise support a means for transmitting, to the UE, one or more downlink messages over the one or more resources of the second set of resources, where the one or more downlink messages and the one or more uplink messages are communicated concurrently.

Additionally or alternatively, the communications manager 1120 may support wireless communication at a base station in accordance with examples as disclosed herein. In some examples, the parameter component 1125 may be configured as or otherwise support a means for transmitting, to a UE, a first indication of a set of uplink power control parameters associated with half-duplex communications at the base station and a second indication of a set of power offsets associated with full-duplex communications at the base station. In some examples, the information component 1130 may be configured as or otherwise support a means for transmitting, to the UE, information indicative of a first set of resources associated with the set of uplink power control parameters and a second set of resources over which to apply the set of power offsets to the set of uplink power control parameters. In some examples, the communication component 1135 may be configured as or otherwise support a means for receiving, from the UE and based on the information, one or more uplink messages over one or more resources of the second set of resources in accordance with the set of uplink power control parameters and the applied set of power offsets.

In some examples, the information indicates a mapping that maps the first set of resources to the set of uplink power control parameters and the second set of resources to the set of power offsets. In some examples, receiving the one or more uplink messages is in accordance with the mapping.

In some examples, the information indicates a pattern of the first set of resources and the second set of resources, the pattern corresponding to a first periodicity of the first set of resources and a second periodicity of the second set of resources. In some examples, receiving the one or more uplink messages is in accordance with the pattern.

In some examples, the information indicates the second set of resources as a subset of a third set of resources that includes the first set of resources and the second set of resources, the first set of resources corresponding to a remaining set of resources of the third set of resources other than the second set of resources.

In some examples, the information indicates the first set of resources as a subset of a third set of resources that includes the first set of resources and the second set of resources, the second set of resources corresponding to a remaining set of resources of the third set of resources other than the first set of resources.

In some examples, the information indicates that the first set of resources are for half-duplex communications at the base station and the second set of resources are for full-duplex communications at the base station.

In some examples, the information indicates for the UE to apply the set of power offsets for a next quantity of slots or symbols, the second set of resources corresponding to the next quantity of slots or symbols.

In some examples, to support transmitting the information, the information component 1130 may be configured as or otherwise support a means for transmitting, to the UE, the information in DCI, a MAC-CE, or RRC signaling.

In some examples, the communication component 1135 may be configured as or otherwise support a means for receiving, from the UE and based on the information, one or more second uplink messages over one or more resources of the first set of resources in accordance with the first set of uplink power control parameters.

In some examples, the communication component 1135 may be configured as or otherwise support a means for transmitting, to the UE, one or more downlink messages over the one or more resources of the second set of resources, where the one or more downlink messages and the one or more uplink messages are communicated concurrently.

Figure 12:
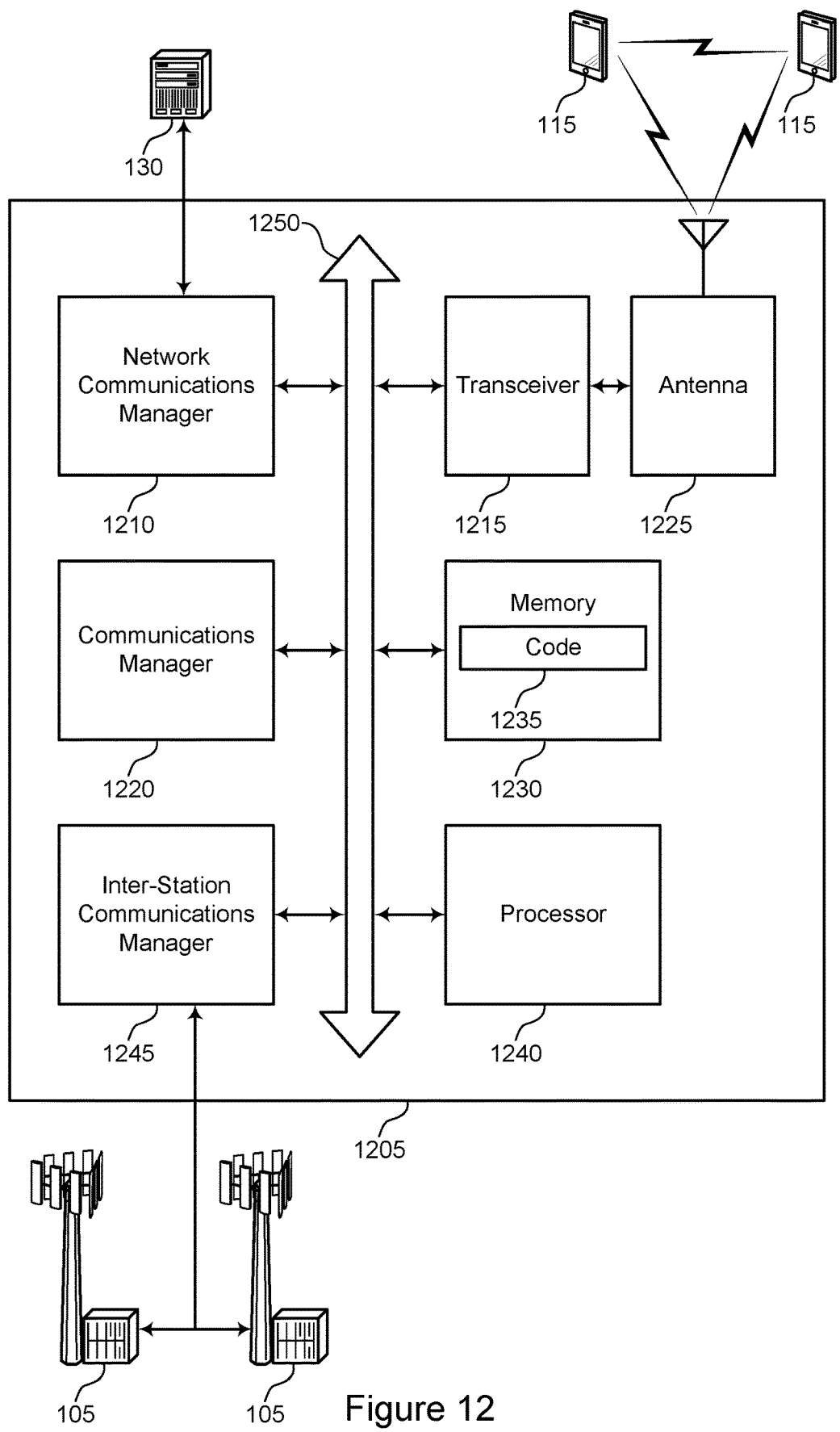
FIG. 12 shows a diagram of a system including a device that supports techniques for uplink power control in accordance with aspects of the present disclosure.

FIG. 12 shows a diagram of a system including a device 1205 that supports techniques for uplink power control in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (for example, operatively, communicatively, functionally, electronically, electrically) via one or more buses (for example, a bus 1250).

The network communications manager 1210 may manage communications with a core network 130 (for example, via one or more wired backhaul links). For example, the network communications manager 1210 may manage the transfer of data communications for client devices, such as one or more UEs 115.

In some examples, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some other cases, a memory controller may be integrated into the processor 1240. The processor 1240 may be configured to execute computer-readable instructions stored in a memory (for example, the memory 1230) to cause the device 1205 to perform various functions (for example, functions or tasks supporting techniques for uplink power control). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a first indication of a first set of uplink power control parameters associated with half-duplex communications at the base station and a second indication of a second set of uplink power control parameters associated with full-duplex communications at the base station. The communications manager 1220 may be configured as or otherwise support a means for transmitting, to the UE, information indicative of a first set of resources associated with the first set of uplink power control parameters and a second set of resources associated with the second set of uplink power control parameters. The communications manager 1220 may be configured as or otherwise support a means for receiving, from the UE and based on the information, one or more uplink messages over one or more resources of the second set of resources in accordance with the second set of uplink power control parameters.

Additionally or alternatively, the communications manager 1220 may support wireless communication at a base station in accordance with examples as disclosed herein. For example, the communications manager 1220 may be configured as or otherwise support a means for transmitting, to a UE, a first indication of a set of uplink power control parameters associated with half-duplex communications at the base station and a second indication of a set of power offsets associated with full-duplex communications at the base station. The communications manager 1220 may be configured as or otherwise support a means for transmitting, to the UE, information indicative of a first set of resources associated with the set of uplink power control parameters and a second set of resources over which to apply the set of power offsets to the set of uplink power control parameters. The communications manager 1220 may be configured as or otherwise support a means for receiving, from the UE and based on the information, one or more uplink messages over one or more resources of the second set of resources in accordance with the set of uplink power control parameters and the applied set of power offsets.

By including or configuring the communications manager 1220 in accordance with examples as described herein, the device 1205 may support techniques for improved reliability, data rates, spectral efficiency, latency, power consumption, battery life, coordination between devices, and resource utilization, among other benefits.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for uplink power control as described herein, or the processor 1240 and the memory 1230 may be otherwise configured to perform or support such operations.

Figure 13:
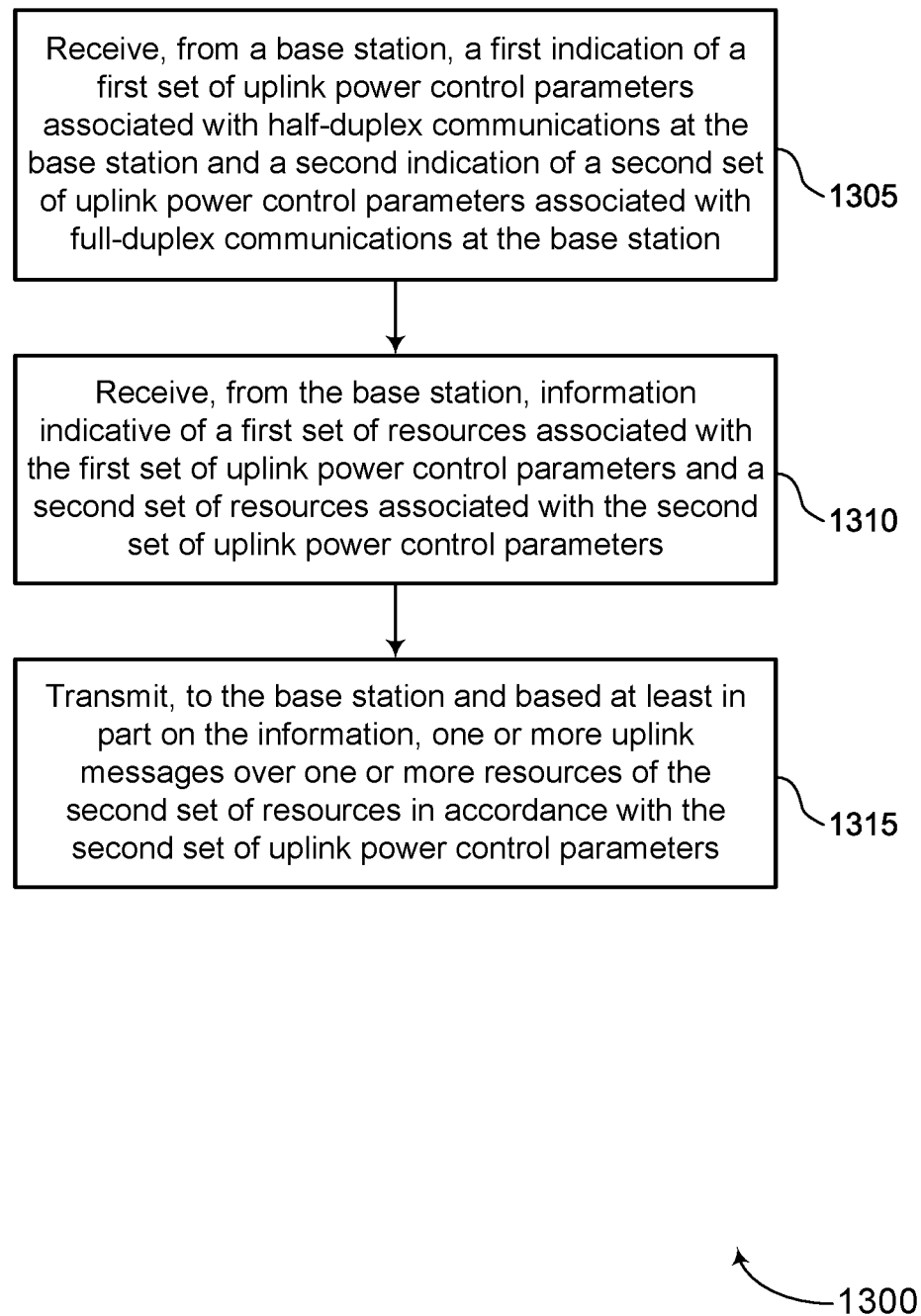
FIGS. 13 through 20 show flowcharts illustrating methods that support techniques for uplink power control in accordance with aspects of the present disclosure.

FIG. 13 shows a flowchart illustrating a method 1300 that supports techniques for uplink power control in accordance with aspects of the present disclosure. The operations of the method 1300 may be implemented by a UE or its components as described herein. For example, the operations of the method 1300 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first indication of a first set of uplink power control parameters associated with half-duplex communications at the base station and a second indication of a second set of uplink power control parameters associated with full-duplex communications at the base station. The operations of 1305 may be performed in accordance with examples as disclosed herein. In some examples, aspects of the operations of 1305 may be performed by a parameter component 725 as described with reference to FIG. 7.

At 1310, the method may include receiving, from the base station, information indicative of a first set of resources associated with the first set of uplink power control parameters and a second set of resources associated with the second set of uplink power control parameters. The operations of 1310 may be performed in accordance with examples as disclosed herein. In some examples, aspects of the operations of 1310 may be performed by an information component 730 as described with reference to FIG. 7.

At 1315, the method may include transmitting, to the base station and based on the information, one or more uplink messages over one or more resources of the second set of resources in accordance with the second set of uplink power control parameters. The operations of 1315 may be performed in accordance with examples as disclosed herein. In some examples, aspects of the operations of 1315 may be performed by a communication component 735 as described with reference to FIG. 7.

Figure 14:
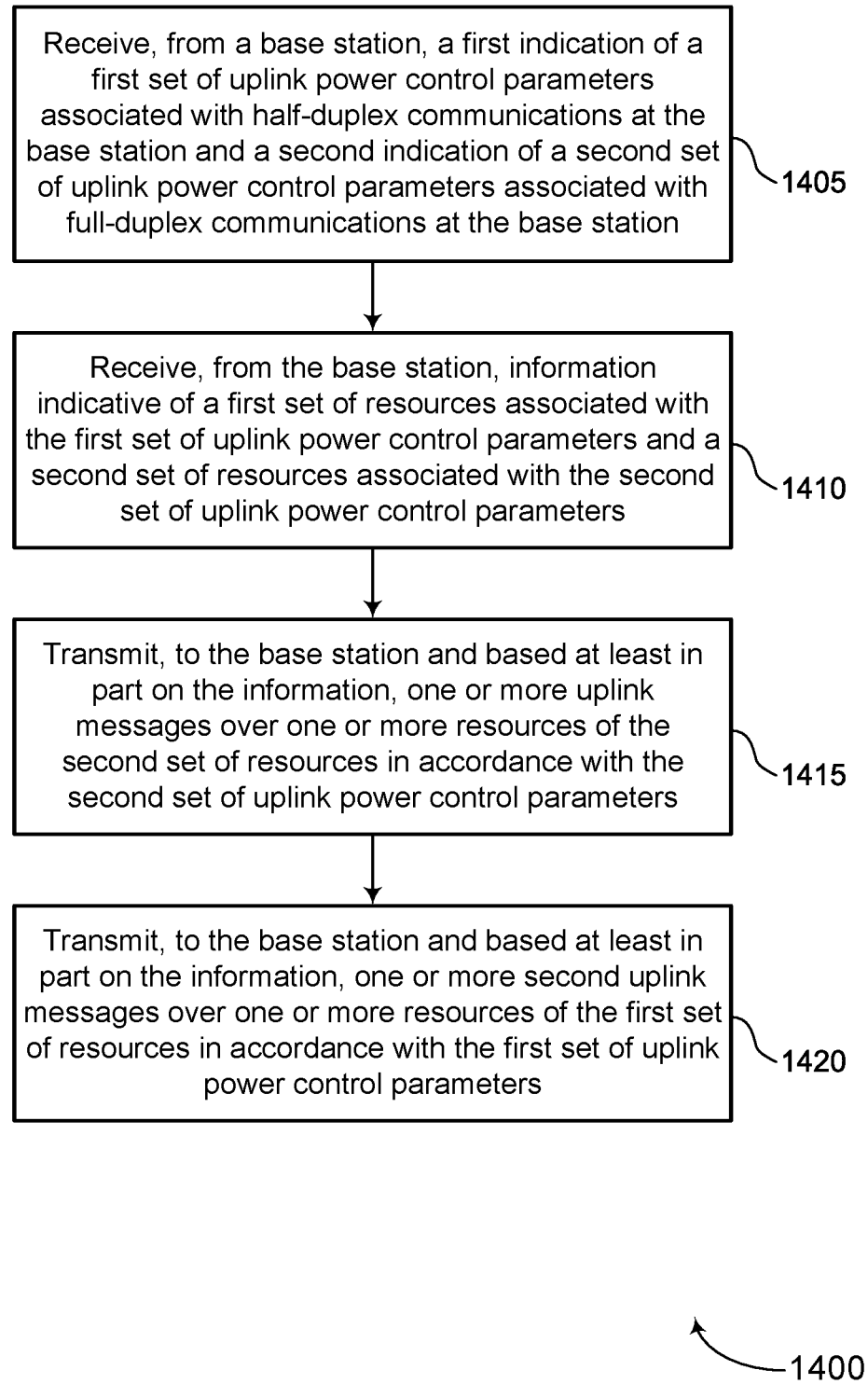

FIG. 14 shows a flowchart illustrating a method 1400 that supports techniques for uplink power control in accordance with aspects of the present disclosure. The operations of the method 1400 may be implemented by a UE or its components as described herein. For example, the operations of the method 1400 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first indication of a first set of uplink power control parameters associated with half-duplex communications at the base station and a second indication of a second set of uplink power control parameters associated with full-duplex communications at the base station. The operations of 1405 may be performed in accordance with examples as disclosed herein. In some examples, aspects of the operations of 1405 may be performed by a parameter component 725 as described with reference to FIG. 7.

At 1410, the method may include receiving, from the base station, information indicative of a first set of resources associated with the first set of uplink power control parameters and a second set of resources associated with the second set of uplink power control parameters. The operations of 1410 may be performed in accordance with examples as disclosed herein. In some examples, aspects of the operations of 1410 may be performed by an information component 730 as described with reference to FIG. 7.

At 1415, the method may include transmitting, to the base station and based on the information, one or more uplink messages over one or more resources of the second set of resources in accordance with the second set of uplink power control parameters. The operations of 1415 may be performed in accordance with examples as disclosed herein. In some examples, aspects of the operations of 1415 may be performed by a communication component 735 as described with reference to FIG. 7.

At 1420, the method may include transmitting, to the base station and based on the information, one or more second uplink messages over one or more resources of the first set of resources in accordance with the first set of uplink power control parameters. The operations of 1420 may be performed in accordance with examples as disclosed herein. In some examples, aspects of the operations of 1420 may be performed by a communication component 735 as described with reference to FIG. 7.

Figure 15:
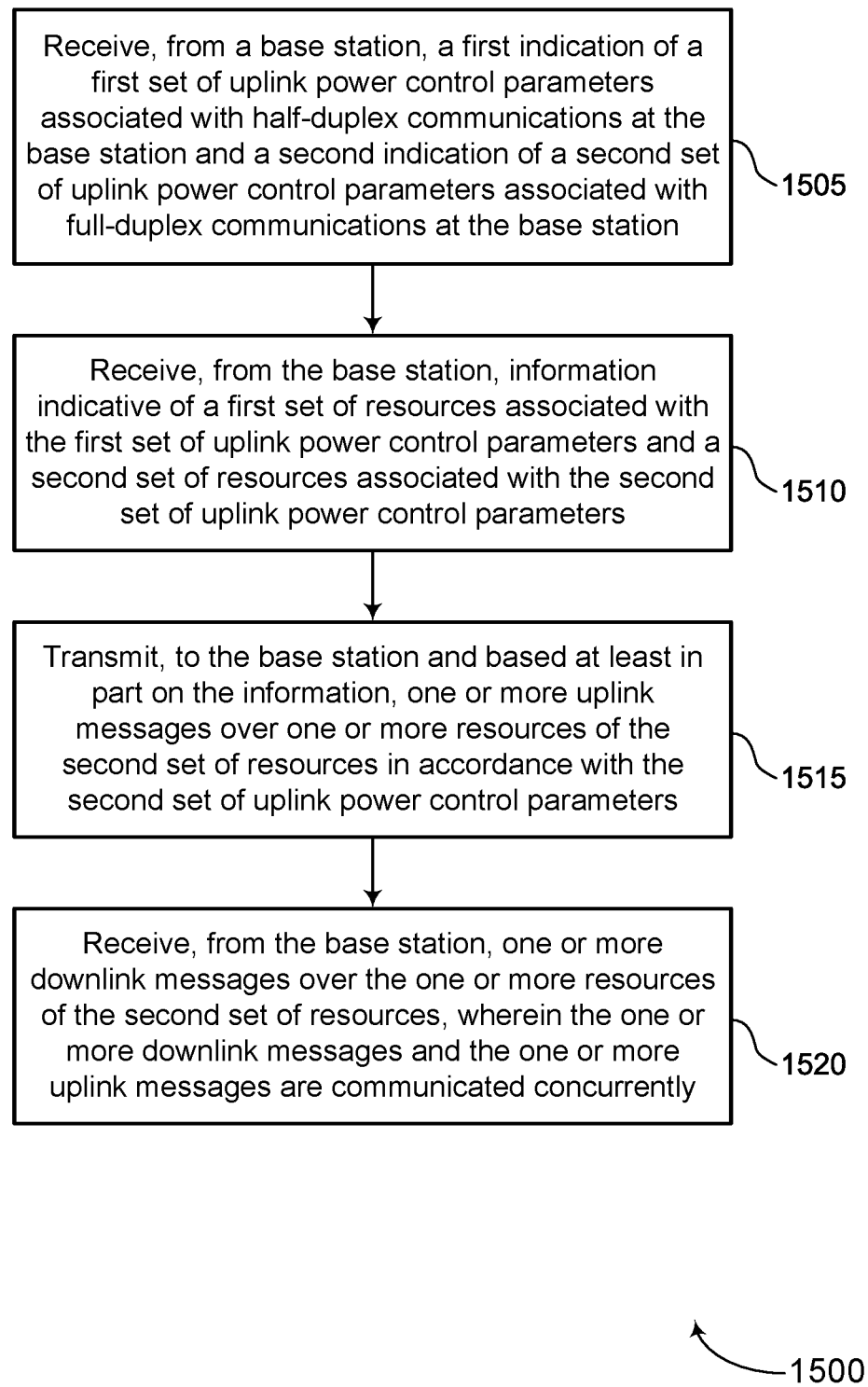

FIG. 15 shows a flowchart illustrating a method 1500 that supports techniques for uplink power control in accordance with aspects of the present disclosure. The operations of the method 1500 may be implemented by a UE or its components as described herein. For example, the operations of the method 1500 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first indication of a first set of uplink power control parameters associated with half-duplex communications at the base station and a second indication of a second set of uplink power control parameters associated with full-duplex communications at the base station. The operations of 1505 may be performed in accordance with examples as disclosed herein. In some examples, aspects of the operations of 1505 may be performed by a parameter component 725 as described with reference to FIG. 7.

At 1510, the method may include receiving, from the base station, information indicative of a first set of resources associated with the first set of uplink power control parameters and a second set of resources associated with the second set of uplink power control parameters. The operations of 1510 may be performed in accordance with examples as disclosed herein. In some examples, aspects of the operations of 1510 may be performed by an information component 730 as described with reference to FIG. 7.

At 1515, the method may include transmitting, to the base station and based on the information, one or more uplink messages over one or more resources of the second set of resources in accordance with the second set of uplink power control parameters. The operations of 1515 may be performed in accordance with examples as disclosed herein. In some examples, aspects of the operations of 1515 may be performed by a communication component 735 as described with reference to FIG. 7.

At 1520, the method may include receiving, from the base station, one or more downlink messages over the one or more resources of the second set of resources, where the one or more downlink messages and the one or more uplink messages are communicated concurrently. The operations of 1520 may be performed in accordance with examples as disclosed herein. In some examples, aspects of the operations of 1520 may be performed by a communication component 735 as described with reference to FIG. 7.

Figure 16:
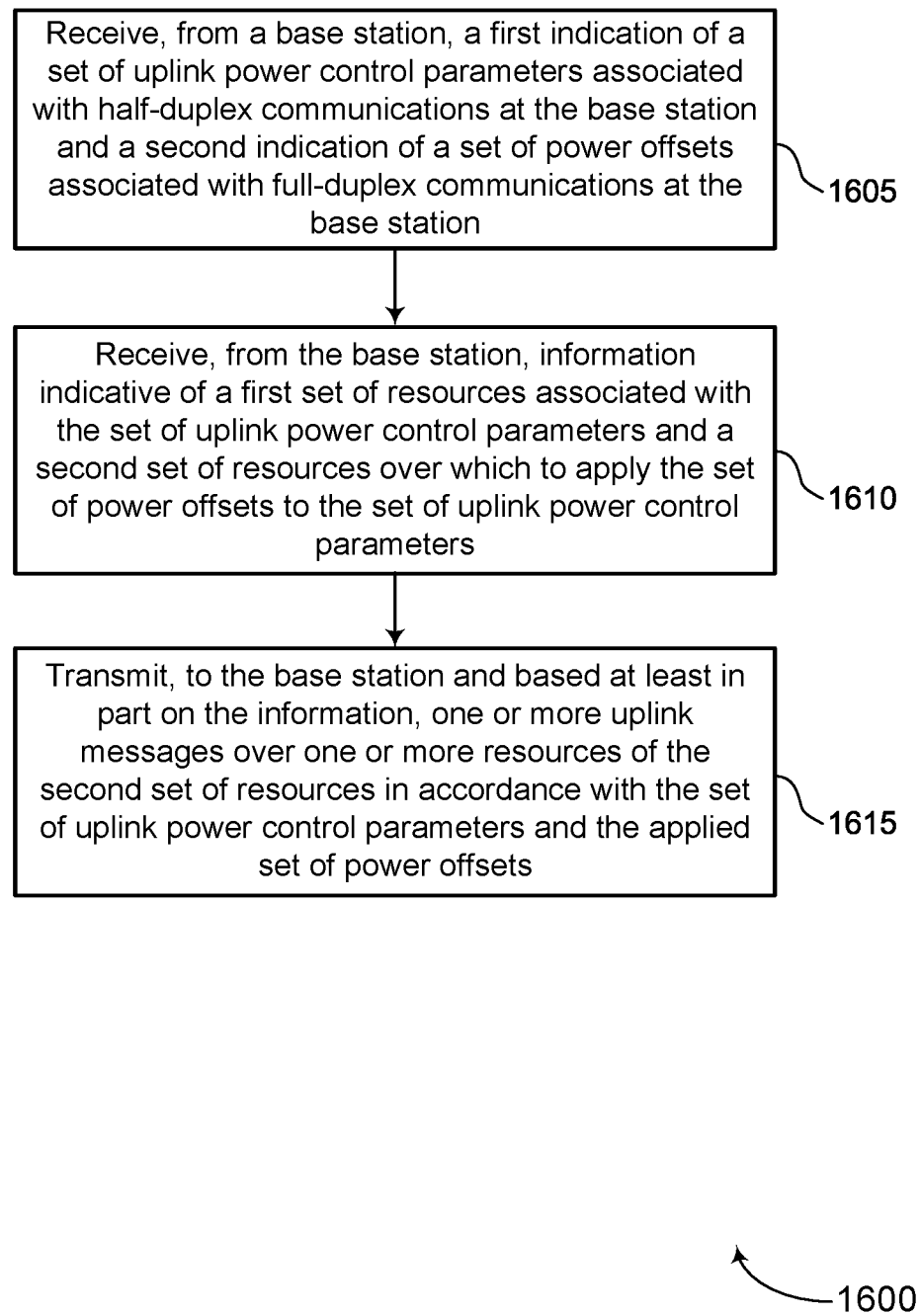

FIG. 16 shows a flowchart illustrating a method 1600 that supports techniques for uplink power control in accordance with aspects of the present disclosure. The operations of the method 1600 may be implemented by a UE or its components as described herein. For example, the operations of the method 1600 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first indication of a set of uplink power control parameters associated with half-duplex communications at the base station and a second indication of a set of power offsets associated with full-duplex communications at the base station. The operations of 1605 may be performed in accordance with examples as disclosed herein. In some examples, aspects of the operations of 1605 may be performed by a parameter component 725 as described with reference to FIG. 7.

At 1610, the method may include receiving, from the base station, information indicative of a first set of resources associated with the set of uplink power control parameters and a second set of resources over which to apply the set of power offsets to the set of uplink power control parameters. The operations of 1610 may be performed in accordance with examples as disclosed herein. In some examples, aspects of the operations of 1610 may be performed by an information component 730 as described with reference to FIG. 7.

At 1615, the method may include transmitting, to the base station and based on the information, one or more uplink messages over one or more resources of the second set of resources in accordance with the set of uplink power control parameters and the applied set of power offsets. The operations of 1615 may be performed in accordance with examples as disclosed herein. In some examples, aspects of the operations of 1615 may be performed by a communication component 735 as described with reference to FIG. 7.

Figure 17:
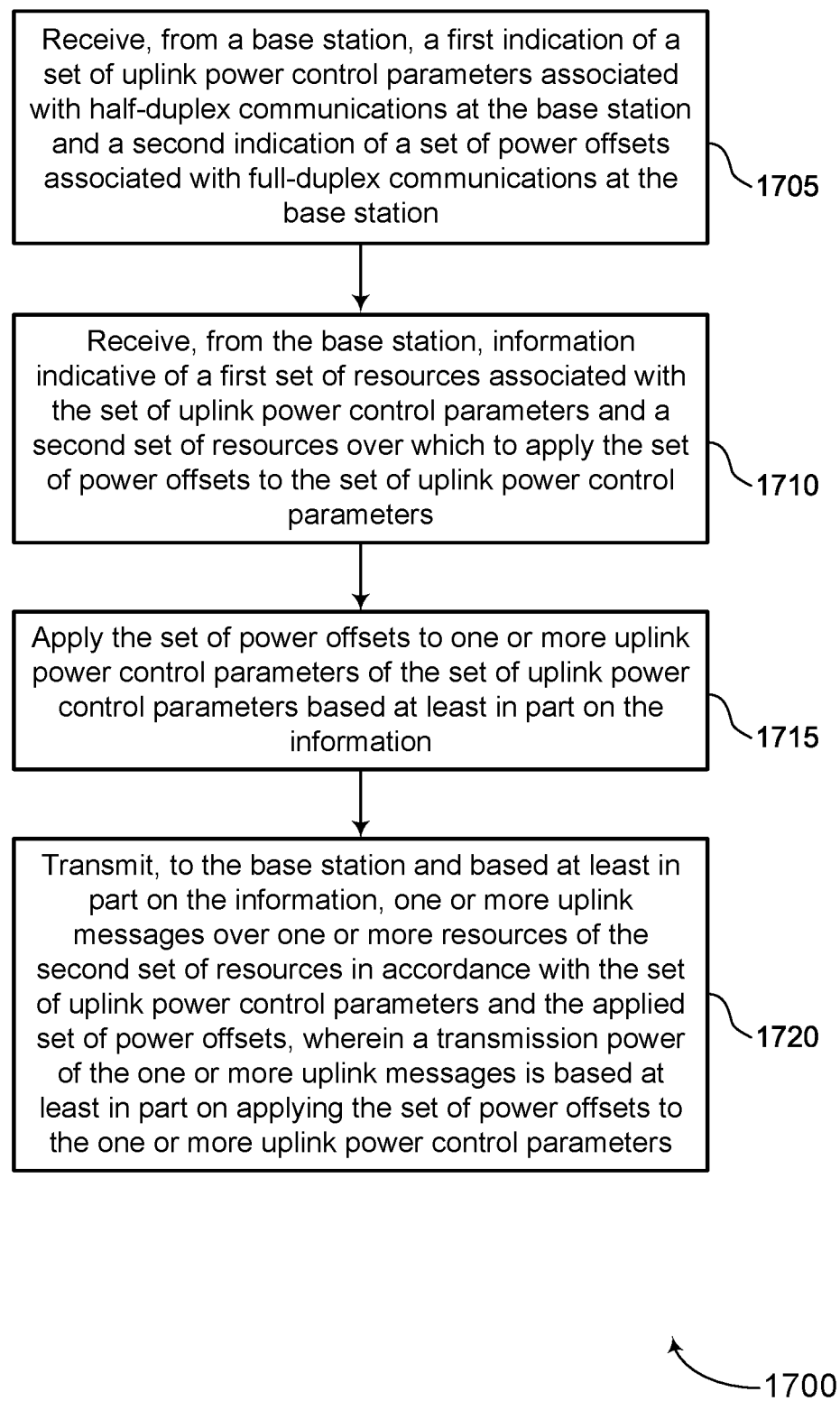

FIG. 17 shows a flowchart illustrating a method 1700 that supports techniques for uplink power control in accordance with aspects of the present disclosure. The operations of the method 1700 may be implemented by a UE or its components as described herein. For example, the operations of the method 1700 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a first indication of a set of uplink power control parameters associated with half-duplex communications at the base station and a second indication of a set of power offsets associated with full-duplex communications at the base station. The operations of 1705 may be performed in accordance with examples as disclosed herein. In some examples, aspects of the operations of 1705 may be performed by a parameter component 725 as described with reference to FIG. 7.

At 1710, the method may include receiving, from the base station, information indicative of a first set of resources associated with the set of uplink power control parameters and a second set of resources over which to apply the set of power offsets to the set of uplink power control parameters. The operations of 1710 may be performed in accordance with examples as disclosed herein. In some examples, aspects of the operations of 1710 may be performed by an information component 730 as described with reference to FIG. 7.

At 1715, the method may include applying the set of power offsets to one or more uplink power control parameters of the set of uplink power control parameters based on the information, where a transmission power of the one or more uplink messages is based on applying the set of power offsets to the one or more uplink power control parameters. The operations of 1715 may be performed in accordance with examples as disclosed herein. In some examples, aspects of the operations of 1715 may be performed by an offset component 740 as described with reference to FIG. 7.

At 1720, the method may include transmitting, to the base station and based on the information, one or more uplink messages over one or more resources of the second set of resources in accordance with the set of uplink power control parameters and the applied set of power offsets. The operations of 1720 may be performed in accordance with examples as disclosed herein. In some examples, aspects of the operations of 1720 may be performed by a communication component 735 as described with reference to FIG. 7.

Figure 18:
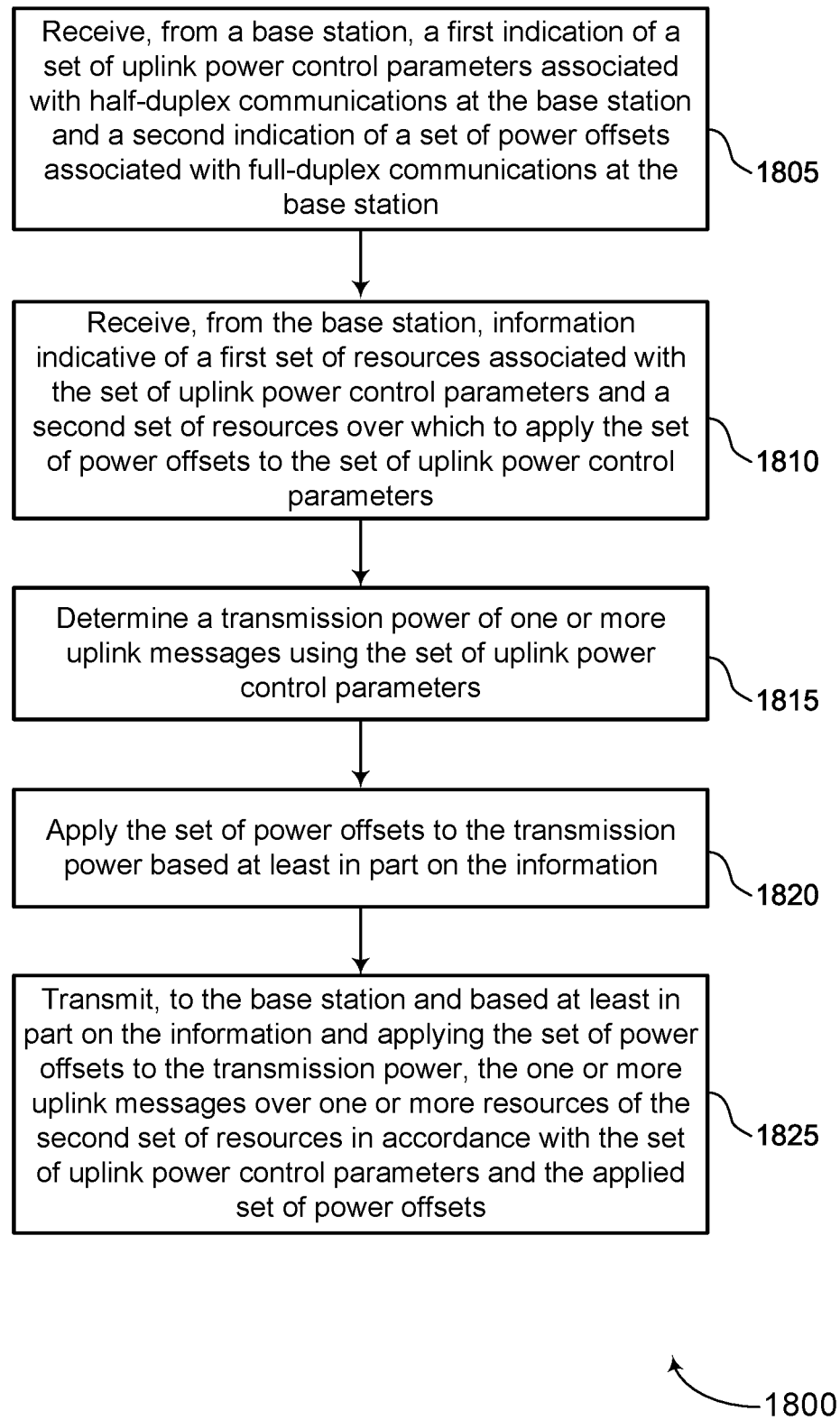

FIG. 18 shows a flowchart illustrating a method 1800 that supports techniques for uplink power control in accordance with aspects of the present disclosure. The operations of the method 1800 may be implemented by a UE or its components as described herein. For example, the operations of the method 1800 may be performed by a UE 115 as described with reference to FIG. 1-8. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a first indication of a set of uplink power control parameters associated with half-duplex communications at the base station and a second indication of a set of power offsets associated with full-duplex communications at the base station. The operations of 1805 may be performed in accordance with examples as disclosed herein. In some examples, aspects of the operations of 1805 may be performed by a parameter component 725 as described with reference to FIG. 7.

At 1810, the method may include receiving, from the base station, information indicative of a first set of resources associated with the set of uplink power control parameters and a second set of resources over which to apply the set of power offsets to the set of uplink power control parameters. The operations of 1810 may be performed in accordance with examples as disclosed herein. In some examples, aspects of the operations of 1810 may be performed by an information component 730 as described with reference to FIG. 7.

At 1815, the method may include determining a transmission power of the one or more uplink messages using the set of uplink power control parameters. The operations of 1815 may be performed in accordance with examples as disclosed herein. In some examples, aspects of the operations of 1815 may be performed by a power component 745 as described with reference to FIG. 7.

At 1820, the method may include applying the set of power offsets to the transmission power based on the information, where transmitting the one or more uplink messages is based on applying the set of power offsets to the transmission power. The operations of 1820 may be performed in accordance with examples as disclosed herein. In some examples, aspects of the operations of 1820 may be performed by an offset component 740 as described with reference to FIG. 7.

At 1825, the method may include transmitting, to the base station and based on the information, one or more uplink messages over one or more resources of the second set of resources in accordance with the set of uplink power control parameters and the applied set of power offsets. The operations of 1825 may be performed in accordance with examples as disclosed herein. In some examples, aspects of the operations of 1825 may be performed by a communication component 735 as described with reference to FIG. 7.

Figure 19:
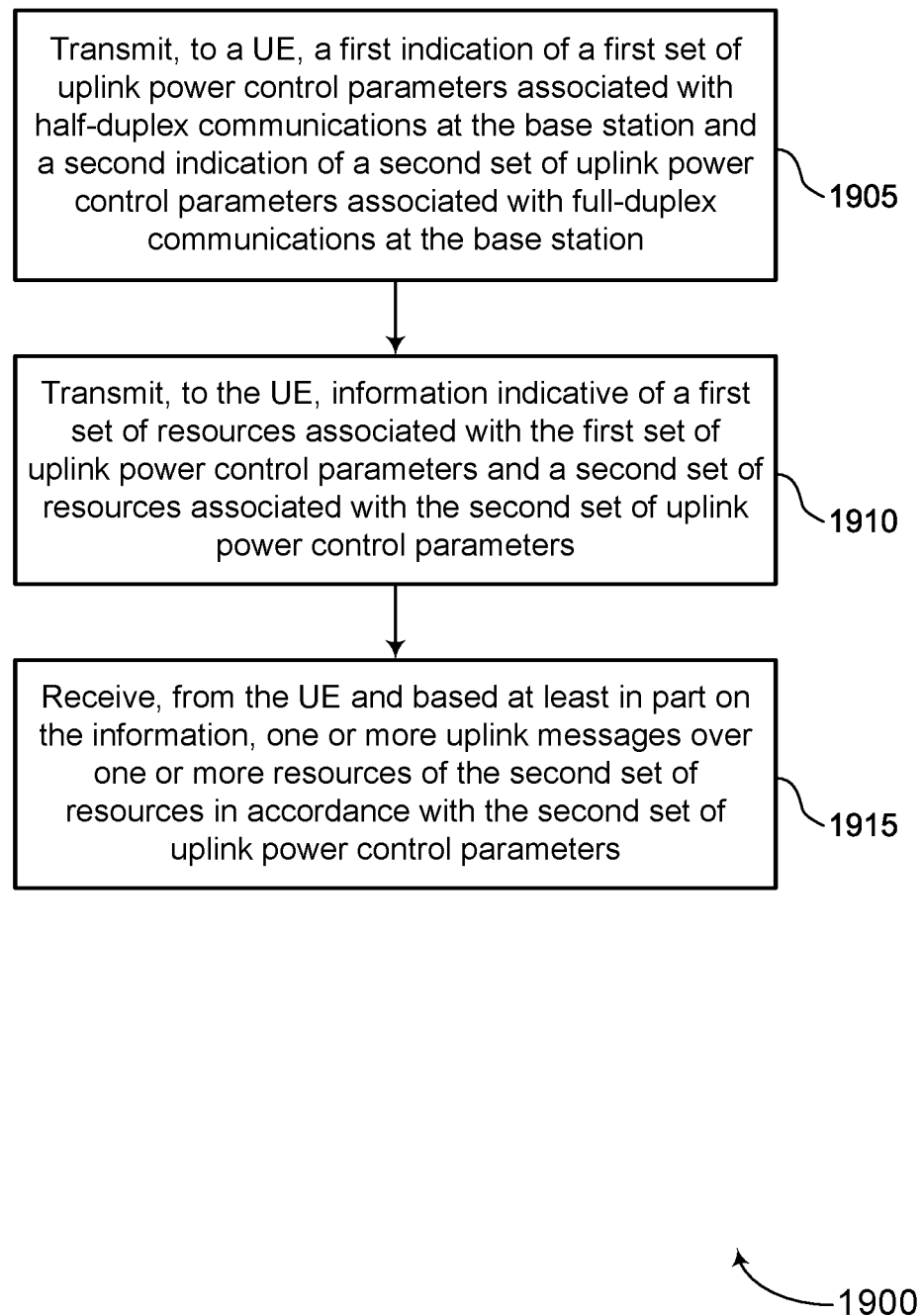

FIG. 19 shows a flowchart illustrating a method 1900 that supports techniques for uplink power control in accordance with aspects of the present disclosure. The operations of the method 1900 may be implemented by a base station or its components as described herein. For example, the operations of the method 1900 may be performed by a base station 105 as described with reference to FIGS. 1-3 and 9-12. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a first indication of a first set of uplink power control parameters associated with half-duplex communications at the base station and a second indication of a second set of uplink power control parameters associated with full-duplex communications at the base station. The operations of 1905 may be performed in accordance with examples as disclosed herein. In some examples, aspects of the operations of 1905 may be performed by a parameter component 1125 as described with reference to FIG. 11.

At 1910, the method may include transmitting, to the UE, information indicative of a first set of resources associated with the first set of uplink power control parameters and a second set of resources associated with the second set of uplink power control parameters. The operations of 1910 may be performed in accordance with examples as disclosed herein. In some examples, aspects of the operations of 1910 may be performed by an information component 1130 as described with reference to FIG. 11.

At 1915, the method may include receiving, from the UE and based on the information, one or more uplink messages over one or more resources of the second set of resources in accordance with the second set of uplink power control parameters. The operations of 1915 may be performed in accordance with examples as disclosed herein. In some examples, aspects of the operations of 1915 may be performed by a communication component 1135 as described with reference to FIG. 11.

Figure 20:
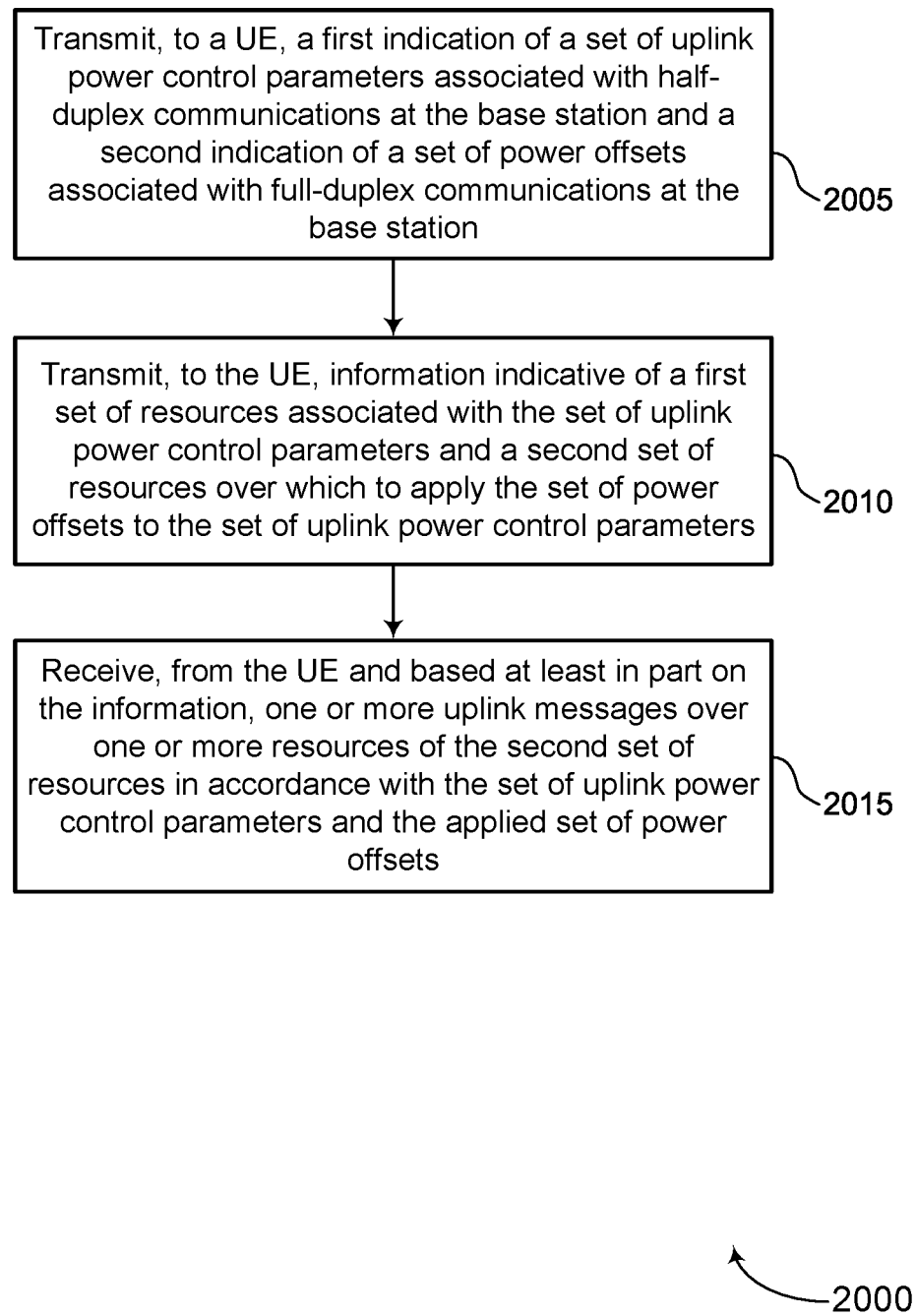

FIG. 20 shows a flowchart illustrating a method 2000 that supports techniques for uplink power control in accordance with aspects of the present disclosure. The operations of the method 2000 may be implemented by a base station or its components as described herein. For example, the operations of the method 2000 may be performed by a base station 105 as described with reference to FIGS. 1-3 and 9-12. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a first indication of a set of uplink power control parameters associated with half-duplex communications at the base station and a second indication of a set of power offsets associated with full-duplex communications at the base station. The operations of 2005 may be performed in accordance with examples as disclosed herein. In some examples, aspects of the operations of 2005 may be performed by a parameter component 1125 as described with reference to FIG. 11.

At 2010, the method may include transmitting, to the UE, information indicative of a first set of resources associated with the set of uplink power control parameters and a second set of resources over which to apply the set of power offsets to the set of uplink power control parameters. The operations of 2010 may be performed in accordance with examples as disclosed herein. In some examples, aspects of the operations of 2010 may be performed by an information component 1130 as described with reference to FIG. 11.

At 2015, the method may include receiving, from the UE and based on the information, one or more uplink messages over one or more resources of the second set of resources in accordance with the set of uplink power control parameters and the applied set of power offsets. The operations of 2015 may be performed in accordance with examples as disclosed herein. In some examples, aspects of the operations of 2015 may be performed by a communication component 1135 as described with reference to FIG. 11.

The following provides an overview of aspects of the present disclosure:

Aspect 1: A method for wireless communication at a UE, comprising: receiving, from a base station, a first indication of a first set of uplink power control parameters associated with half-duplex communications at the base station and a second indication of a second set of uplink power control parameters associated with full-duplex communications at the base station; receiving, from the base station, information indicative of a first set of resources associated with the first set of uplink power control parameters and a second set of resources associated with the second set of uplink power control parameters; and transmitting, to the base station and based at least in part on the information, one or more uplink messages over one or more resources of the second set of resources in accordance with the second set of uplink power control parameters.

Aspect 2: The method of aspect 1, wherein the information indicates a mapping that maps the first set of resources to the first set of uplink power control parameters and the second set of resources to the second set of uplink power control parameters, and transmitting the one or more uplink messages is in accordance with the mapping.

Aspect 3: The method of aspect 1, wherein the information indicates a pattern of the first set of resources and the second set of resources, the pattern corresponding to a first periodicity of the first set of resources and a second periodicity of the second set of resources, and transmitting the one or more uplink messages is in accordance with the pattern.

Aspect 4: The method of aspect 1, wherein the information indicates the second set of resources as a subset of a third set of resources that comprises the first set of resources and the second set of resources, the first set of resources corresponding to a remaining set of resources of the third set of resources other than the second set of resources.

Aspect 5: The method of aspect 1, wherein the information indicates the first set of resources as a subset of a third set of resources that comprises the first set of resources and the second set of resources, the second set of resources corresponding to a remaining set of resources of the third set of resources other than the first set of resources.

Aspect 6: The method of aspect 1, wherein the information indicates for the UE to use the second set of uplink power control parameters for a next quantity of slots or symbols, the second set of resources corresponding to the next quantity of slots or symbols.

Aspect 7: The method of any of aspects 1 through 6, wherein the information indicates that the first set of resources are for half-duplex communications at the base station and the second set of resources are for full-duplex communications at the base station.

Aspect 8: The method of any of aspects 1 through 7, wherein receiving the information comprises: receiving, from the base station, the information in DCI, a MAC-CE, or RRC signaling.

Aspect 9: The method of any of aspects 1 through 8, further comprising: transmitting, to the base station and based at least in part on the information, one or more second uplink messages over one or more resources of the first set of resources in accordance with the first set of uplink power control parameters.

Aspect 10: The method of any of aspects 1 through 9, wherein the second set of uplink power control parameters are associated with uplink messages having a higher transmission power than uplink messages associated with the first set of uplink power control parameters.

Aspect 11: The method of any of aspects 1 through 10, further comprising: receiving, from the base station, one or more downlink messages over the one or more resources of the second set of resources, wherein the one or more downlink messages and the one or more uplink messages are communicated concurrently.

Aspect 12: A method for wireless communication at a UE, comprising: receiving, from a base station, a first indication of a set of uplink power control parameters associated with half-duplex communications at the base station and a second indication of a set of power offsets associated with full-duplex communications at the base station; receiving, from the base station, information indicative of a first set of resources associated with the set of uplink power control parameters and a second set of resources over which to apply the set of power offsets to the set of uplink power control parameters; and transmitting, to the base station and based at least in part on the information, one or more uplink messages over one or more resources of the second set of resources in accordance with the set of uplink power control parameters and the applied set of power offsets.

Aspect 13: The method of aspect 12, wherein the information indicates a mapping that maps the first set of resources to the set of uplink power control parameters and the second set of resources to the set of power offsets, and transmitting the one or more uplink messages is in accordance with the mapping.

Aspect 14: The method of aspect 12, wherein the information indicates a pattern of the first set of resources and the second set of resources, the pattern corresponding to a first periodicity of the first set of resources and a second periodicity of the second set of resources, and transmitting the one or more uplink messages is in accordance with the pattern.

Aspect 15: The method of aspect 12, wherein the information indicates the second set of resources as a subset of a third set of resources that comprises the first set of resources and the second set of resources, the first set of resources corresponding to a remaining set of resources of the third set of resources other than the second set of resources.

Aspect 16: The method of aspect 12, wherein the information indicates the first set of resources as a subset of a third set of resources that comprises the first set of resources and the second set of resources, the second set of resources corresponding to a remaining set of resources of the third set of resources other than the first set of resources.

Aspect 17: The method of aspect 12, wherein the information indicates for the UE to apply the set of power offsets for a next quantity of slots or symbols, the second set of resources corresponding to the next quantity of slots or symbols.

Aspect 18: The method of any of aspects 12 through 17, wherein the information indicates that the first set of resources are for half-duplex communications at the base station and the second set of resources are for full-duplex communications at the base station.

Aspect 19: The method of any of aspects 12 through 18, wherein receiving the information comprises: receiving, from the base station, the information in DCI, a MAC-CE, or RRC signaling.

Aspect 20: The method of any of aspects 12 through 19, further comprising: applying the set of power offsets to one or more uplink power control parameters of the set of uplink power control parameters based at least in part on the information, wherein a transmission power of the one or more uplink messages is based at least in part on applying the set of power offsets to the one or more uplink power control parameters.

Aspect 21: The method of any of aspects 12 through 19, further comprising: determining a transmission power of the one or more uplink messages using the set of uplink power control parameters; and applying the set of power offsets to the transmission power based at least in part on the information, wherein transmitting the one or more uplink messages is based at least in part on applying the set of power offsets to the transmission power.

Aspect 22: The method of any of aspects 12 through 21, further comprising: transmitting, to the base station and based at least in part on the information, one or more second uplink messages over one or more resources of the first set of resources in accordance with the set of uplink power control parameters.

Aspect 23: The method of any of aspects 12 through 22, further comprising: receiving, from the base station, one or more downlink messages over the one or more resources of the second set of resources, wherein the one or more downlink messages and the one or more uplink messages are communicated concurrently.

Aspect 24: A method for wireless communication at a base station, comprising: transmitting, to a UE, a first indication of a first set of uplink power control parameters associated with half-duplex communications at the base station and a second indication of a second set of uplink power control parameters associated with full-duplex communications at the base station; transmitting, to the UE, information indicative of a first set of resources associated with the first set of uplink power control parameters and a second set of resources associated with the second set of uplink power control parameters; and receiving, from the UE and based at least in part on the information, one or more uplink messages over one or more resources of the second set of resources in accordance with the second set of uplink power control parameters.

Aspect 25: The method of aspect 24, wherein the information indicates a mapping that maps the first set of resources to the first set of uplink power control parameters and the second set of resources to the second set of uplink power control parameters, and the one or more uplink messages is in accordance with the mapping.

Aspect 26: The method of aspect 24, wherein the information indicates a pattern of the first set of resources and the second set of resources, the pattern corresponding to a first periodicity of the first set of resources and a second periodicity of the second set of resources, and receiving the one or more uplink messages is in accordance with the pattern.

Aspect 27: The method of aspect 24, wherein the information indicates the second set of resources as a subset of a third set of resources that comprises the first set of resources and the second set of resources, the first set of resources corresponding to a remaining set of resources of the third set of resources other than the second set of resources.

Aspect 28: The method of aspect 24, wherein the information indicates the first set of resources as a subset of a third set of resources that comprises the first set of resources and the second set of resources, the second set of resources corresponding to a remaining set of resources of the third set of resources other than the first set of resources.

Aspect 29: The method of aspect 24, wherein the information indicates for the UE to use the second set of uplink power control parameters for a next quantity of slots or symbols, the second set of resources corresponding to the next quantity of slots or symbols.

Aspect 30: The method of any of aspects 24 through 29, wherein the information indicates that the first set of resources are for half-duplex communications at the base station and the second set of resources are for full-duplex communications at the base station.

Aspect 31: The method of any of aspects 24 through 30, wherein transmitting the information comprises: transmitting, to the UE, the information in DCI, a MAC-CE, or RRC signaling.

Aspect 32: The method of any of aspects 24 through 31, further comprising: receiving, from the UE and based at least in part on the information, one or more second uplink messages over one or more resources of the first set of resources in accordance with the first set of uplink power control parameters.

Aspect 33: The method of any of aspects 24 through 32, wherein the second set of uplink power control parameters are associated with uplink messages having a higher transmission power than uplink messages associated with the first set of uplink power control parameters.

Aspect 34: The method of any of aspects 24 through 33, further comprising: transmitting, to the UE, one or more downlink messages over the one or more resources of the second set of resources, wherein the one or more downlink messages and the one or more uplink messages are communicated concurrently.

Aspect 35: A method for wireless communication at a base station, comprising: transmitting, to a UE, a first indication of a set of uplink power control parameters associated with half-duplex communications at the base station and a second indication of a set of power offsets associated with full-duplex communications at the base station; transmitting, to the UE, information indicative of a first set of resources associated with the set of uplink power control parameters and a second set of resources over which to apply the set of power offsets to the set of uplink power control parameters; and receiving, from the UE and based at least in part on the information, one or more uplink messages over one or more resources of the second set of resources in accordance with the set of uplink power control parameters and the applied set of power offsets.

Aspect 36: The method of aspect 35, wherein the information indicates a mapping that maps the first set of resources to the set of uplink power control parameters and the second set of resources to the set of power offsets, and receiving the one or more uplink messages is in accordance with the mapping.

Aspect 37: The method of aspect 35, wherein the information indicates a pattern of the first set of resources and the second set of resources, the pattern corresponding to a first periodicity of the first set of resources and a second periodicity of the second set of resources, and receiving the one or more uplink messages is in accordance with the pattern.

Aspect 38: The method of aspect 35, wherein the information indicates the second set of resources as a subset of a third set of resources that comprises the first set of resources and the second set of resources, the first set of resources corresponding to a remaining set of resources of the third set of resources other than the second set of resources.

Aspect 39: The method of aspect 35, wherein the information indicates the first set of resources as a subset of a third set of resources that comprises the first set of resources and the second set of resources, the second set of resources corresponding to a remaining set of resources of the third set of resources other than the first set of resources.

Aspect 40: The method of aspect 35, wherein the information indicates for the UE to apply the set of power offsets for a next quantity of slots or symbols, the second set of resources corresponding to the next quantity of slots or symbols.

Aspect 41: The method of any of aspects 35 through 40, wherein the information indicates that the first set of resources are for half-duplex communications at the base station and the second set of resources are for full-duplex communications at the base station.

Aspect 42: The method of any of aspects 35 through 41, wherein transmitting the information comprises: transmitting, to the UE, the information in DCI, a MAC-CE, or RRC signaling.

Aspect 43: The method of any of aspects 35 through 42, further comprising: receiving, from the UE and based at least in part on the information, one or more second uplink messages over one or more resources of the first set of resources in accordance with the first set of uplink power control parameters.

Aspect 44: The method of any of aspects 35 through 43, further comprising: transmitting, to the UE, one or more downlink messages over the one or more resources of the second set of resources, wherein the one or more downlink messages and the one or more uplink messages are communicated concurrently.

Aspect 45: An apparatus for wireless communication at a UE, comprising a processor; memory coupled with the processor; and instructions stored in the memory and executable by the processor to cause the apparatus to perform a method of any of aspects 1 through 11.

Aspect 46: An apparatus for wireless communication at a UE, comprising at least one means for performing a method of any of aspects 1 through 11.

Aspect 47: A non-transitory computer-readable medium storing code for wireless communication at a UE, the code comprising instructions executable by a processor to perform a method of any of aspects 1 through 11.

Aspect 48: An apparatus for wireless communication at a UE, comprising a processor; memory coupled with the processor; and instructions stored in the memory and executable by the processor to cause the apparatus to perform a method of any of aspects 12 through 23.

Aspect 49: An apparatus for wireless communication at a UE, comprising at least one means for performing a method of any of aspects 12 through 23.

Aspect 50: A non-transitory computer-readable medium storing code for wireless communication at a UE, the code comprising instructions executable by a processor to perform a method of any of aspects 12 through 23.

Aspect 51: An apparatus for wireless communication at a base station, comprising a processor; memory coupled with the processor; and instructions stored in the memory and executable by the processor to cause the apparatus to perform a method of any of aspects 24 through 34.

Aspect 52: An apparatus for wireless communication at a base station, comprising at least one means for performing a method of any of aspects 24 through 34.

Aspect 53: A non-transitory computer-readable medium storing code for wireless communication at a base station, the code comprising instructions executable by a processor to perform a method of any of aspects 24 through 34.

Aspect 54: An apparatus for wireless communication at a base station, comprising a processor; memory coupled with the processor; and instructions stored in the memory and executable by the processor to cause the apparatus to perform a method of any of aspects 35 through 44.

Aspect 55: An apparatus for wireless communication at a base station, comprising at least one means for performing a method of any of aspects 35 through 44.

Aspect 56: A non-transitory computer-readable medium storing code for wireless communication at a base station, the code comprising instructions executable by a processor to perform a method of any of aspects 35 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a parameter message comprising a first indication of a first set of uplink power control parameters for half-duplex communications at the base station and a second indication of a second set of uplink power control parameters for full-duplex communications at the base station;
   receiving, from the base station, information indicative of a first set of resources for the first set of uplink power control parameters and a second set of resources for the second set of uplink power control parameters; and
   transmitting, to the base station and based at least in part on the information, one or more uplink messages over one or more resources of the second set of resources in accordance with the second set of uplink power control parameters.

2. The method of claim 1, wherein:
   the information indicates a mapping that maps the first set of resources to the first set of uplink power control parameters and the second set of resources to the second set of uplink power control parameters, and
   transmitting the one or more uplink messages is in accordance with the mapping.

3. The method of claim 1, wherein:
   the information indicates a pattern of the first set of resources and the second set of resources, the pattern corresponding to a first periodicity of the first set of resources and a second periodicity of the second set of resources, and
   transmitting the one or more uplink messages is in accordance with the pattern.

4. The method of claim 1, wherein the information indicates the second set of resources as a subset of a third set of resources that comprises the first set of resources and the second set of resources, the first set of resources corresponding to a remaining set of resources of the third set of resources other than the second set of resources.

5. The method of claim 1, wherein the information indicates the first set of resources as a subset of a third set of resources that comprises the first set of resources and the second set of resources, the second set of resources corresponding to a remaining set of resources of the third set of resources other than the first set of resources.

6. The method of claim 1, wherein the information indicates that the first set of resources are for the half-duplex communications at the base station and the second set of resources are for the full-duplex communications at the base station.

7. The method of claim 1, wherein the information indicates for the UE to use the second set of uplink power control parameters for a next quantity of slots or symbols, the second set of resources corresponding to the next quantity of slots or symbols.

8. The method of claim 1, wherein receiving the information comprises receiving, from the base station, the information in downlink control information, a medium access control-control element, or radio resource control signaling.

9. The method of claim 1, further comprising transmitting, to the base station and based at least in part on the information, one or more second uplink messages over one or more resources of the first set of resources in accordance with the first set of uplink power control parameters.

10. The method of claim 1, wherein the second set of uplink power control parameters are associated with uplink messages having a higher transmission power than uplink messages associated with the first set of uplink power control parameters.

11. The method of claim 1, further comprising receiving, from the base station, one or more downlink messages over the one or more resources of the second set of resources, wherein the one or more downlink messages and the one or more uplink messages are communicated concurrently.

12. A method for wireless communication at a user equipment (UE), comprising:
   receiving, from a base station, a parameter message comprising a first indication of a set of uplink power control parameters for half-duplex communications at the base station and a second indication of a set of power offsets for full-duplex communications at the base station;
   receiving, from the base station, information indicative of a first set of resources for the set of uplink power control parameters and a second set of resources over which to apply the set of power offsets to the set of uplink power control parameters; and
   transmitting, to the base station and based at least in part on the information, one or more uplink messages over one or more resources of the second set of resources in accordance with the set of uplink power control parameters and the applied set of power offsets.

13. The method of claim 12, wherein:
   the information indicates a mapping that maps the first set of resources to the set of uplink power control parameters and the second set of resources to the set of power offsets, and
   transmitting the one or more uplink messages is in accordance with the mapping.

14. The method of claim 12, wherein:
   the information indicates a pattern of the first set of resources and the second set of resources, the pattern corresponding to a first periodicity of the first set of resources and a second periodicity of the second set of resources, and
   transmitting the one or more uplink messages is in accordance with the pattern.

15. The method of claim 12, wherein the information indicates the second set of resources as a subset of a third set of resources that comprises the first set of resources and the second set of resources, the first set of resources corresponding to a remaining set of resources of the third set of resources other than the second set of resources.

16. The method of claim 12, wherein the information indicates the first set of resources as a subset of a third set of resources that comprises the first set of resources and the second set of resources, the second set of resources corresponding to a remaining set of resources of the third set of resources other than the first set of resources.

17. The method of claim 12, wherein the information indicates that the first set of resources are for the half-duplex communications at the base station and the second set of resources are for the full-duplex communications at the base station.

18. The method of claim 12, wherein the information indicates for the UE to apply the set of power offsets for a next quantity of slots or symbols, the second set of resources corresponding to the next quantity of slots or symbols.

19. The method of claim 12, wherein receiving the information comprises receiving, from the base station, the information in downlink control information, a medium access control-control element, or radio resource control signaling.

20. The method of claim 12, further comprising applying the set of power offsets to one or more uplink power control parameters of the set of uplink power control parameters based at least in part on the information, wherein a transmission power of the one or more uplink messages is based at least in part on applying the set of power offsets to the one or more uplink power control parameters.

21. The method of claim 12, further comprising:
determining a transmission power of the one or more uplink messages using the set of uplink power control parameters; and
applying the set of power offsets to the transmission power based at least in part on the information, wherein transmitting the one or more uplink messages is based at least in part on applying the set of power offsets to the transmission power.

22. The method of claim 12, further comprising transmitting, to the base station and based at least in part on the information, one or more second uplink messages over one or more resources of the first set of resources in accordance with the set of uplink power control parameters.

23. The method of claim 12, further comprising receiving, from the base station, one or more downlink messages over the one or more resources of the second set of resources, wherein the one or more downlink messages and the one or more uplink messages are communicated concurrently.

24. A method for wireless communication at a base station, comprising:
transmitting, to a user equipment (UE), a parameter message comprising a first indication of a first set of uplink power control parameters for half-duplex communications at the base station and a second indication of a second set of uplink power control parameters for full-duplex communications at the base station;
transmitting, to the UE, information indicative of a first set of resources for the first set of uplink power control parameters and a second set of resources for the second set of uplink power control parameters; and
receiving, from the UE and based at least in part on the information, one or more uplink messages over one or more resources of the second set of resources in accordance with the second set of uplink power control parameters.

25. The method of claim 24, wherein:
the information indicates a mapping that maps the first set of resources to the first set of uplink power control parameters and the second set of resources to the second set of uplink power control parameters, and
the one or more uplink messages is in accordance with the mapping.

26. The method of claim 24, wherein:
the information indicates a pattern of the first set of resources and the second set of resources, the pattern corresponding to a first periodicity of the first set of resources and a second periodicity of the second set of resources, and
receiving the one or more uplink messages is in accordance with the pattern.

27. The method of claim 24, wherein the information indicates the second set of resources as a subset of a third set of resources that comprises the first set of resources and the second set of resources, the first set of resources corresponding to a remaining set of resources of the third set of resources other than the second set of resources.

28. A method for wireless communication at a base station, comprising:
transmitting, to a user equipment (UE), a parameter message comprising a first indication of a set of uplink power control parameters for half-duplex communications at the base station and a second indication of a set of power offsets for full-duplex communications at the base station;
transmitting, to the UE, information indicative of a first set of resources for the set of uplink power control parameters and a second set of resources over which to apply the set of power offsets to the set of uplink power control parameters; and
receiving, from the UE and based at least in part on the information, one or more uplink messages over one or more resources of the second set of resources in accordance with the set of uplink power control parameters and the applied set of power offsets.

29. The method of claim 28, wherein:
the information indicates a mapping that maps the first set of resources to the set of uplink power control parameters and the second set of resources to the set of power offsets, and
receiving the one or more uplink messages is in accordance with the mapping.

30. The method of claim 28, wherein:
the information indicates a pattern of the first set of resources and the second set of resources, the pattern corresponding to a first periodicity of the first set of resources and a second periodicity of the second set of resources, and
receiving the one or more uplink messages is in accordance with the pattern.

* * * * *